United States Patent
Wigren

(10) Patent No.: US 9,295,009 B2
(45) Date of Patent: Mar. 22, 2016

(54) TRANSCENDENTAL FUNCTION LOOK-UP TABLES FOR THERMAL NOISE POWER FLOOR ESTIMATION

(71) Applicant: Telefonaktiebolaget L M Ericsson (publ), Stockholm (SE)

(72) Inventor: Torbjörn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 116 days.

(21) Appl. No.: 13/993,429

(22) PCT Filed: May 17, 2013

(86) PCT No.: PCT/SE2013/050561
§ 371 (c)(1),
(2) Date: Jun. 12, 2013

(87) PCT Pub. No.: WO2013/176603
PCT Pub. Date: Nov. 28, 2013

(65) Prior Publication Data
US 2014/0056164 A1 Feb. 27, 2014

Related U.S. Application Data

(60) Provisional application No. 61/650,508, filed on May 23, 2012, provisional application No. 61/650,574, filed on May 23, 2012.

(51) Int. Cl.
*H04W 24/00* (2009.01)
*G01R 29/26* (2006.01)
(Continued)

(52) U.S. Cl.
CPC .............. *H04W 52/243* (2013.01); *G06F 1/035* (2013.01); *H04B 1/1027* (2013.01); *H04B 17/345* (2015.01); *H04W 24/00* (2013.01); *H04W 52/343* (2013.01); *H04W 88/08* (2013.01)

(58) Field of Classification Search
CPC ...... H04B 15/00; H04B 17/00; H04B 1/1027; H04W 24/00
See application file for complete search history.

(56) References Cited

U.S. PATENT DOCUMENTS 5,224,064 A 6/1993 Henry et al.
6,047,283 A * 4/2000 Braun
(Continued)

FOREIGN PATENT DOCUMENTS

WO 2007/024166 A1 3/2007
WO WO 2008/039123 4/2008
(Continued)

OTHER PUBLICATIONS

International Search Report and Written Opinion with transmittal sheet dated Jan. 22, 2014 in corresponding International Application No. PCT/SE2013/050561 (12 pages total).
(Continued)

*Primary Examiner* — Alex Skripnikov
(74) *Attorney, Agent, or Firm* — Patent Portfolio Builders, PLLC

(57) ABSTRACT

Embodiments herein relate to a method in a radio base station for performing thermal noise power floor estimation in a radio communications network. The radio base station computes table entries for a table for a transcendental function evaluation, which table is of minimized size with a range of table entries defined by a smallest table entry, a largest table entry, and a number of table entries. The radio base station further estimates a thermal noise power floor by performing a transcendental function evaluation in computing a product representing a cumulative probability function, which cumulative probability function is related to the thermal noise power floor. The transcendental function evaluation is performed by using table look ups of the table with the computed table entries.

12 Claims, 17 Drawing Sheets

(51) Int. Cl.
  *H04W 52/24* (2009.01)
  *H04B 17/345* (2015.01)
  *H04W 52/34* (2009.01)
  *G06F 1/035* (2006.01)
  *H04B 1/10* (2006.01)
  *H04W 88/08* (2009.01)

(56) References Cited

U.S. PATENT DOCUMENTS

| | | | |
|---|---|---|---|
| 6,883,012 B1* | 4/2005 | Ryan | H03M 7/04 |
| | | | 708/277 |
| 6,959,082 B1* | 10/2005 | Holeva | 379/388.03 |
| 7,912,461 B2 | 3/2011 | Wigren | |
| 2005/0169522 A1* | 8/2005 | Schoner | G09G 5/02 |
| | | | 382/167 |
| 2007/0157063 A1 | 7/2007 | Concil et al. | |
| 2007/0177536 A1 | 8/2007 | Brueck et al. | |
| 2009/0311968 A1* | 12/2009 | Wigren | 455/67.13 |
| 2010/0035558 A1* | 2/2010 | Wigren | 455/67.13 |
| 2011/0009070 A1 | 1/2011 | Wigren | |
| 2011/0098014 A1 | 4/2011 | Martens et al. | |
| 2012/0147828 A1* | 6/2012 | Wigren | H04W 72/1268 |
| | | | 370/329 |
| 2012/0196589 A1 | 8/2012 | Wigren | |

FOREIGN PATENT DOCUMENTS

| | | |
|---|---|---|
| WO | 2011/071430 A1 | 6/2011 |
| WO | 2011/119075 A1 | 9/2011 |
| WO | 2013-043093 A1 | 3/2013 |

OTHER PUBLICATIONS

Kambiz Shoarinejad et al., "Integrated Predictive Power Control and Dynamic Channel Assignment in Mobile Radio Systems", IEEE Transactions on Wireless Communications, vol. 2, No. 5, Sep. 2003, pp. 976-988.
International Search Report and Written Opinion mailed Jan. 27, 2014 in International Application No. PCT/SE2013/050643 (13 pages total).
Torbjörn Wigren, "Low Complexity Kalman Filtering for Inter-Cell Interference and Power Based Load Estimation in the WCDMA Uplink", Signal Processing and Communication Systems (ICSPCS), 2011 5$^{th}$ International Conference on, Dec. 2011 (10 pages).
Inventor: Torbjörn Wigren, U.S. Appl. No. 13/488,187, filed Jun. 4, 2012, "Other Cell Interference Estimation".
Inventor: Torbjörn Wigren, U.S. Appl. No. 13/776,328, filed Feb. 25, 2013, "Grant Utilization Based Other Cell Interference Estimation".
Inventor: Torbjörn Wigren, U.S. Appl. No. 13/656,581, filed Oct. 19, 2012, "Method, Apparatus, and System for Interference and Noise Estimation".
Inventor: Torbjörn Wigren, U.S. Appl. No. 13/853,369, filed Mar. 29, 2013, "Interference Estimation With TDM".
International Search Report and Written Opinion mailed May 22, 2014 in International Application No. PCT/SE2014/050078 (13 pages total).
Wigren, T., "Estimation of uplink WCDMA load in a single RBS", IEEE, (2007), 5 pages.
Wigren, T., "Recursive Noise Floor Estimation in WCDMA", IEEE Transactions on Vehicular Technology, vol. 59, No. 5, (Jun. 2010), pp. 2615-2620.
Wigren, T., "Soft Uplink Load Estimation in WCDMA", IEEE Transactions on Vehicular Technology, vol. 58, No. 2, (Feb. 2009), pp. 760-772.
Office Action in EP application No. 13794266.0 mailed Jul. 8, 2015.

* cited by examiner

TRANSCENDENTAL FUNCTION LOOK-UP TABLES FOR THERMAL NOISE POWER FLOOR ESTIMATION

This application is the U.S. national phase of International Application No. PCT/SE2013/050561, filed 17 May 2013, which designated the U.S. and claims the benefit from U.S. Provisional Application No. 61/650,508, filed 23 May 2012, and U.S. Provisional Application No. 61/650,574, filed 23 May 2012, the entire contents of each of which are hereby incorporated by reference.

TECHNICAL FIELD

Embodiments herein relate to a radio base station and a method therein. In particular embodiments herein relate to thermal noise power floor estimation.

BACKGROUND

In a typical cellular radio system or a radio communications network, wireless terminals, also known as mobile stations and/or user equipments (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks (CN).

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) for user equipments. In a forum known as the Third Generation Partnership Project (3GPP), telecommunications suppliers propose and agree upon standards for third generation networks and UTRAN specifically, and investigate enhanced data rate and radio capacity. Specifications for the Evolved Packet System (EPS) have completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g., eNodeBs in LTE, and the core network. As such, the RAN of an EPS system has an essentially "flat" architecture comprising radio base station nodes without reporting to RNCs.

Recently two main trends have emerged in the cellular telephony business. First mobile broadband traffic is more or less exploding. The technical consequence is a corresponding steep increase of the interference in these networks, or equivalently, a steep increase of the load. This makes it important to exploit the load headroom that is left in the most efficient way. Secondly, radio communications networks are becoming more heterogeneous, with macro radio base stations being supported by micro radio base stations at traffic hot spots. Furthermore, home base stations, also called femto radio base stations, are emerging in many networks. This trend clearly puts increasing demands on inter-cell interference management.

Below it is described the measurement and estimation techniques, needed to measure the instantaneous total load, also referred to as the received total power value, on the uplink air interface.

WCDMA Load

The Need for Accurate Load Estimation

The air interface load of the WCDMA uplink is a fundamental quantity for the scheduling, in the RBS, of enhanced uplink (EUL) users.
  the admission and congestion control algorithms, in the RNC, that also control the load created by release 99 user equipments.

There are several reasons for this. Firstly, the fast inner power control loop coupling between user equipments can create instability if too much load is allowed in the uplink, due to the so called the party effect. Such power rushes originate e.g. when a new high power user equipment is entering the uplink causing interference. Since the inner loop power control strives to maintain the signal to interference ratio (SIR) at a specified level, the consequence is that the other user equipments of the cell increase their powers, which in turn increases the interference and lead to additional power increases. At a certain point this process goes unstable with unlimited power increases of all user equipments in the uplink of the cell.

Secondly, it is well known that increased interference levels reduce the coverage, simply because a terminal or user equipment needs to transmit with a higher power to overcome an increased interference level. At the cell boundary, the UE power is hence saturated, meaning that the UE must move towards the base station to be detected—hence the cell size is reduced.

Thirdly, the scheduling of enhanced uplink user equipments in the RBS does not account for release 99 legacy traffic from UEs that do not support EUL. Even modern user equipments may lack support for EUL. In order to keep the air interface load under control, release 99 traffic must hence be monitored elsewhere. In WCDMA this control functionality is performed in the RNC, by the admission and congestion control algorithms. Since the consequences, instability and loss of coverage, are the same as for EUL user equipments when the air interface becomes over utilized, it follows that also the admission and congestion control algorithms need to have access to a measure of the momentary air interface load.

Finally, it is crucial that the load measure is accurate. This follows since the load, which is expressed as a (noise) Rise over Thermal, see below, is usually limited to be below 10-15 dB. It also follows that any load estimation errors will require margins that reduce the limit of 10-15 dB to lower values, a fact that will reduce the cell capacity. Hence all quantities that are used to form the uplink air-interface load need to be estimated very accurately, say at 0.1-0.2 dB level so as not to limit uplink mobile broadband performance.

The Need for Low Computational Complexity Load Estimation

For reasons described in section "Problems in WCDMA load estimation" below, load estimation in WCDMA is complicated and dedicated algorithms are needed in order to provide accurate estimates of both the thermal noise power floor, also referred to as the noise floor estimate, and the load in terms of the rise over thermal, also referred to as the noise rise estimate. Each of these algorithms is associated with a specific number of arithmetic operations per second, performed in a computer of some kind. The need for a low computational complexity is best understood by noting that:

The thermal noise power floor is unique for each analogue signal path, from the receive antenna in to the digital receiver unit. This is so because the thermal noise power floor measured in the digital receiver is dependent on variations due to at least i) component variations resulting in variation of the antenna element noise factor, ii) random variations of the component values to the front end electronics components that e.g. form pre-amplifiers, iii) variations due to installation of cabling and connectors at the RBS site. The consequence is that the thermal noise power floor needs to be estimated separately for each antenna branch, i.e. one thermal noise power floor estimation algorithm instance is needed for each antenna branch.

The rise over thermal is directly dependent on i) the thermal noise power floor of the antenna branch, and ii) the total received wideband power. Since i) introduces an antenna branch dependence, and since fading makes the received total wideband power vary significantly between antenna branches, it follows that also the rise over thermal floor needs to be estimated separately for each antenna branch, i.e. one rise over thermal estimation algorithm instance is needed for each antenna branch.

The need for low complexity estimation algorithms is then due to the fact that many algorithm instances need to be executed in parallel in the RBS. To understand how many, it can be noted that an RBS supports:

Multiple sectors, typically three 120 degree sectors or six 60 degree sectors.

Multiple antenna branches per sector, today up to 4 antenna branches.

Multiple carriers, i.e. frequencies, per sector and antenna branch, today up to 2 carriers in the uplink.

A typical RBS may have 3 sectors, 4 antenna branches per sector and 2 carriers per sector and antenna branch, i.e. a need for 3*4*2=24 algorithm instances for rise over thermal and thermal noise power floor estimation, respectively. Typical RBS configurations are subject to constraints between sectors, antenna branches and carriers. However, it can be foreseen that the numbers listed above will increase in the future, meaning that the total number of needed instances of the above two estimation algorithms may approach at least 100. The consequence is that it becomes crucial to minimize the computational complexity of each algorithm instance.

Problems in WCDMA Load Estimation

It is well known that the load at the antenna connector of the WCDMA uplink is given by the noise rise, or Rise over Thermal, RoT(t), defined by $$RoT(t) = \frac{RTWP(t)}{N_0(t)},\qquad\text{eq. (1)}$$

where $N_0(t)$ is the thermal noise power floor, also referred to as noise floor level, noise power floor level or thermal noise level, as measured at the antenna connector. t denotes the time. It remains to define what is meant with RTWP(t). The definition used here is simply the Received Total Wideband Power RTWP(t)

$$RTWP(t) = \sum_{k=1}^{K} P_k(t) + I^N(t) + N_0(t),\qquad\text{eq. (2)}$$

also measured at the antenna connector. Here $I^N(t)$ denotes the power as received from neighbour cells ($^N$) of the WCDMA system, and $P_k(t)$ is the power of the k:th user of the own cell. As will be seen below, the major difficulty of any RoT estimation algorithm is to separate the thermal noise power floor from the interference from neighbor cells.

Another specific problem that needs to be addressed is that the signal reference points are, by definition at the antenna connector. The measurements are however obtained after the analogue signal conditioning chain, in the digital receiver. The analogue signal conditioning chain does introduce a scale factor error, about 1-3 dB, 1-sigma, that is difficult to compensate for. Fortunately, all powers of eq. (2) are equally affected by the scale factor error so when eq. (1) is calculated, the scale factor error is cancelled as $$RoT^{DigitalReceiver}(t) = \qquad\text{eq. (3)}$$

$$\frac{RTWP^{DigitalReceiver}(t)}{N^{DigitalReceiver}(t)} = \frac{\gamma(t)RTWP^{Antenna}(t)}{\gamma(t)N^{Antenna}(t)} = RoT^{Antenna}(t).$$

The superscripts $^{Digital\ Receiver}$ and $^{Antenna}$ indicate quantities valid at the digital receiver and the antenna respectively, and $\gamma(t)$ denotes said scale factor error. In order to understand the fundamental problem of neighbor cell interference when performing load estimation, note that $$I^N(t)+N_0(t)=E[I^N(t)]+E[N_0(t)]+\Delta I^N(t)+\Delta N_0(t)\qquad\text{eq. (4)}$$

where E[ ] denotes mathematical expectation and where Δ denotes the variation around the mean. The fundamental problem can now be clearly seen. Since there are no measurements available in the RBS that are related to the neighbor cell interference, a linear filtering operation can at best estimate the sum $E[I^N(t)]+E[N_0(t)]$. This estimate cannot be used to deduce the value of $E[N_0(t)]$. The situation is the same as when the sum of two numbers is available. Then there is no way to figure out the values of the individual numbers. This issue is analyzed rigorously for the RoT estimation problem in [1] where it is proved that the thermal noise power floor is not mathematically observable.

Currently, the radio subsystem of the WCDMA RBS is experiencing severe Central Processing Unit (CPU) overload. This overload is causing crashes and slow response to commands. The problem with existing algorithms for thermal noise power floor estimation and rise over thermal estimation is that the computational complexity is too high, when new functionality is introduced and when the number of algorithm instances increases.

In more detail:

The computational complexity of the fundamental rise over thermal (RoT) estimation algorithm, operating in the WCDMA uplink is too high. With up to 8 instances running in parallel on one radio subsystem, average CPU load is up above 90%, max target for healthy radio sub-system operation is below 70%. Here the RoT estimation is responsible for about 70% of the CPU load.

The computational complexity of the fundamental thermal noise power floor ($N_0(t)$) estimation algorithm, operating in the WCDMA uplink is too high. These algorithm instances are executed much more seldom, but when they are executed, they cause additional load that makes the requested total CPU load exceed 100%. This may cause radio subsystem crashes. This is not acceptable since it affects key performance indicators, e.g. the average cell down time.

In the future, it is planned to move said estimation algorithms to other parts of the RBS. Also then it is crucial to reduce the computational complexity, the reason being that after a move several hundred instances of said algorithms may need to be executed in parallel since there are several radio sub-system units for each RBS, and that the size of the RBS increases, e.g. by addition of antenna branches.

SUMMARY

An object of embodiments herein is to provide computation means that reduce the computational complexities of computing thermal noise floor estimate in a radio communications network.

According to an aspect of embodiments herein the object is achieved by a method in a radio base station for performing thermal noise power floor estimation in a radio communications network. The radio base station computes table entries for a table for a transcendental function evaluation, which table is of minimized size with a range of table entries defined by a smallest table entry, a largest table entry, and the number of table entries. The radio base station also estimates a thermal noise power floor by performing a transcendental function evaluation in computing a product representing a cumulative probability function. The cumulative probability function is related to the thermal noise power floor, and the transcendental function evaluation is performed by using table look ups of the table with the computed table entries.

According to another aspect of embodiments herein the object is achieved by a radio base station for performing thermal noise power floor estimation in a radio communications network.

The radio base station comprises a processing circuit configured to compute table entries for a table for a transcendental function evaluation, which table is of minimized size with a range of table entries defined by a smallest table entry, a largest table entry, and the number of table entries. The processing circuit is further configured to estimate a thermal noise power floor by performing a transcendental function evaluation in computing a product representing a cumulative probability function. The transcendental function evaluation is performed by using table look ups of the table with the computed table entries and the cumulative probability function is related to the thermal noise power floor.

The disclosed embodiments herein reduce the complexity of the transcendental function evaluation by trading reduced range and accuracy not needed for thermal noise power floor estimation, for a reduced computational effort in that the table is minimized, resulting in reduced processing time.

BRIEF DESCRIPTION OF THE DRAWINGS

Embodiments will now be described in more detail in relation to the enclosed drawings, in which.

DETAILED DESCRIPTION

Figure 1:
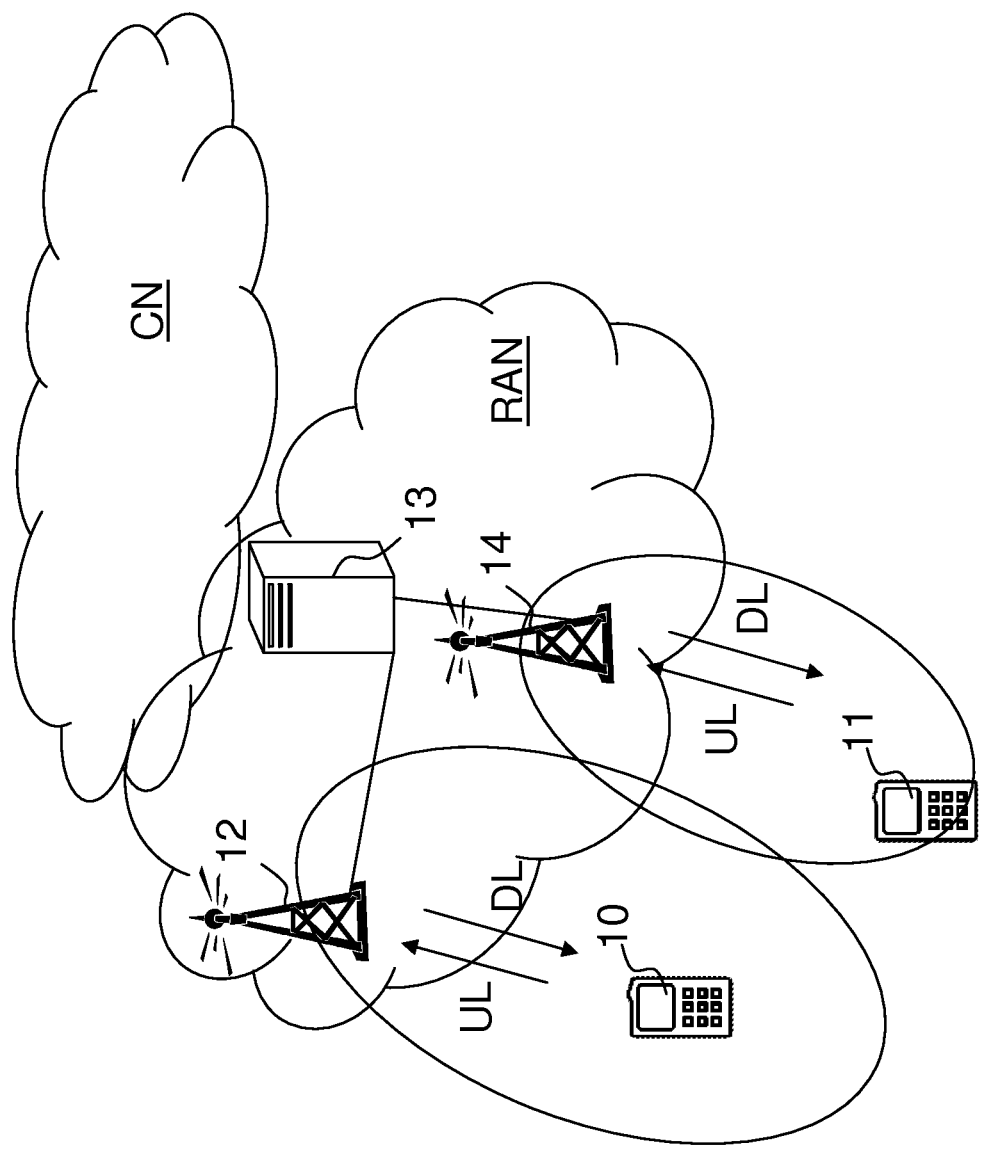
FIG. 1 is a schematic overview depicting a radio communications network according to embodiments herein.

FIG. 1 discloses a radio communications network 1. In today's radio communications networks a number of different technologies are used, such as LTE, LTE-Advanced, WCDMA, Global System for Mobile communications/Enhanced Data rate for GSM Evolution (GSM/EDGE), Worldwide Interoperability for Microwave Access (WiMax), Code Division Multiple Access (CDMA) 2000, or Ultra Mobile Broadband (UMB), just to mention a few possible implementations. The radio communications network 1 comprises a radio base station 12, also referred to as a first radio base station 12, in a RAN connecting to a Core network (CN). The radio base station 12 provides radio coverage over at least one geographical area forming a cell. The cell definition may also incorporate frequency bands used for transmissions, which means that two different cells may cover the same geographical area but using different frequency bands/carriers. User equipment (UE) 10, also referred to as a first user equipment, is served in the cell by the radio base station 12 and is communicating with the radio base station 12. It should be understood that the term "user equipment" is a non-limiting term which means any wireless terminal, device or node e.g. Personal Digital Assistant (PDA), laptop, mobile device, sensor, relay, mobile tablets, a Location Services (LCS) target device in general, an LCS client in the network or even a small base station. The user equipment 10 transmits data over an air or radio interface to the radio base station 12 in uplink (UL) transmissions and the radio base station 12 transmits data over an air or radio interface to the user equipment 10 in downlink (DL) transmissions. A second user equipment 11 is served in another cell by e.g. another radio base station 14, which may in fact be the same radio base station as the radio base station 12. UL transmissions from the second user equipment 11 may interfere at the radio base station 12. In e.g. WCDMA the radio base station 12 may be controlled by a RNC 13. The term RNC should here not be interpreted to strictly so as to comprise only an RNC according to the 3GPP UTRAN standard, but any network control node capable of mapping a data session to different transmission paths through its different ports wherein the different transmission paths exploit different routing protocols. For instance, in case of a CDMA 2000 network, the RNC functionality described below according to embodiments herein may be realised in the Base Station Controllers (BSC) of the CDMA 2000 network.

The radio base station 12 or stations, which is an example of a radio network node, may also be referred to as e.g. a NodeB, an evolved Node B (eNB, eNode B), a base transceiver station, Access Point Base Station, base station router, or any other network unit capable to communicate with the user equipment 10 within the cell depending e.g. of the radio access technology and terminology used. Also, the radio base station 12 may further serve one or more cells. Other examples of a radio network node serving the user equipment 10 is a relay node or a beacon node.

According to embodiments herein the radio base station 12 computes table entries for a table for a transcendental function evaluation. The table is of minimized size with a range of table entries, i.e. the number of table entries, defined by a smallest table entry, a largest table entry, and a number of table entries, may also be referred to as the number of table entries. The radio base station 12 estimates a thermal noise power floor by performing a transcendental function evaluation in computing a product representing a cumulative probability function, which cumulative probability function is related to the thermal noise power floor. The transcendental function evaluation is performed by using table look ups of the table with the computed table entries.

The disclosed embodiments herein reduce the complexity of the transcendental function evaluation by trading reduced range and accuracy not needed for thermal noise power floor estimation, for a reduced computational effort, resulting in reduced processing time.

Figure 2:
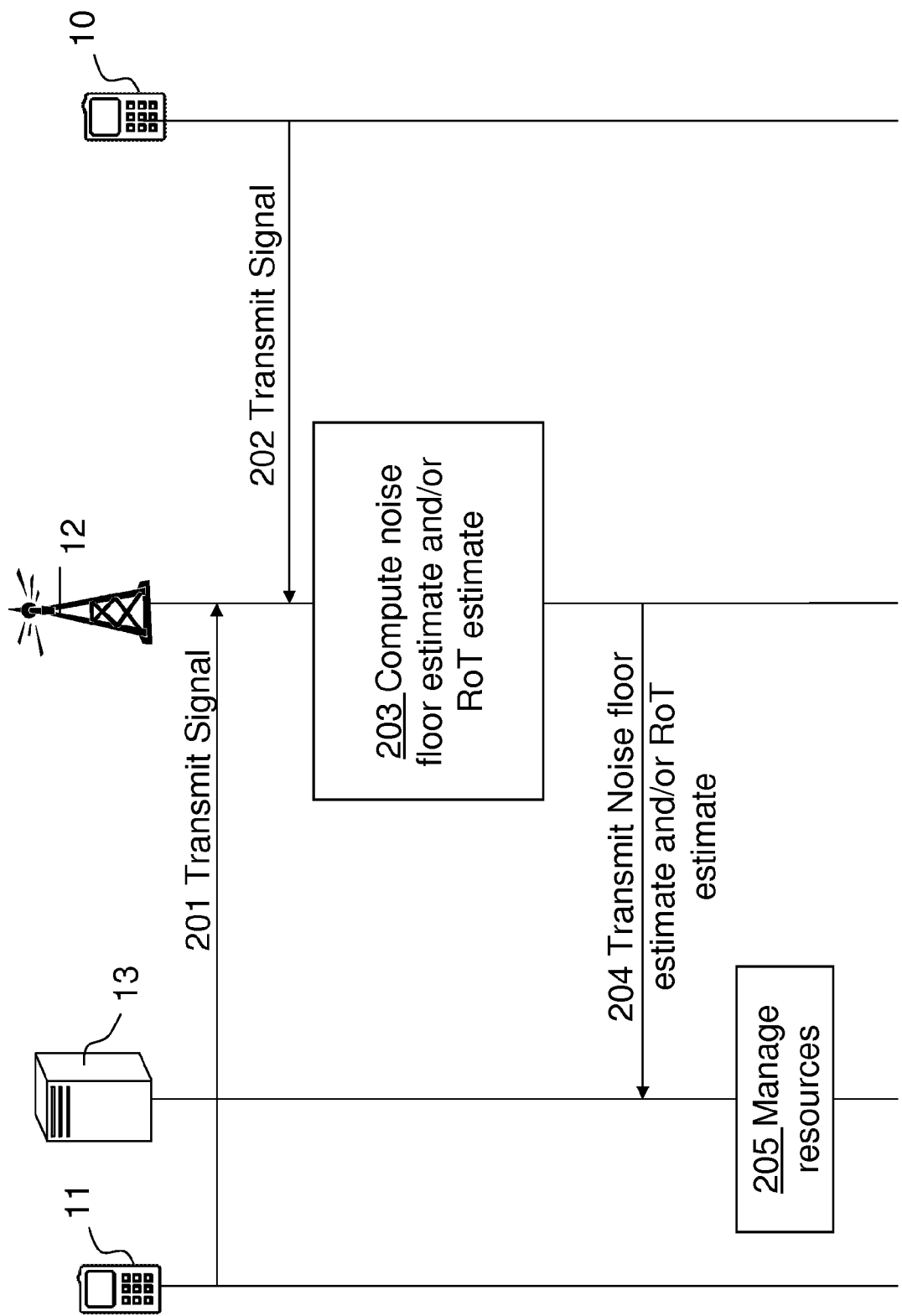
FIG. 2 is a combined flowchart and signaling scheme according to embodiments herein.

A combined signaling scheme and flowchart is disclosed in FIG. 2.

Action 201. The other or second user equipment 11 in the other cell transmits a signal that interferes with the (first) radio base station 12.

Action 202. The (first) user equipment 10 transmits a signal to the radio base station 12.

Action 203. According to embodiments herein the radio base station 12 measures a received total power value $P_{RTWP}$ at a receiver of the radio base station 12, also referred to as a Received Total Wide band Power (RTWP), including a noise generated in the receiver, within a bandwidth defined by a receiver pulse shaping filter. Furthermore, the radio base station 12 estimates the thermal noise power floor, $N_0(t)$, in the cell which may be used to determine Rise over Thermal (RoT)=RTWP/$N_0$. This will be explained in more detail below in FIGS. 3-14.

Action 204. The radio base station 12 may then transmit the estimated Thermal noise floor power floor and/or an estimated RoT to the RNC 13.

Action 205. The RNC 13 may then use the received estimated thermal noise power floor and/or the estimated RoT when managing resources in the radio communications network. That is, the RNC 13 may take the estimated thermal noise power floor and/or the estimated RoT into account when scheduling resources or similar.

Noise Floor Estimation Algorithms in Prior Art

The noise power floor estimation algorithms to which embodiments herein apply are described in detail in [1]-[3] and in WO2008041895. A summary is provided here.

Sliding Window Algorithm

Figure 3:
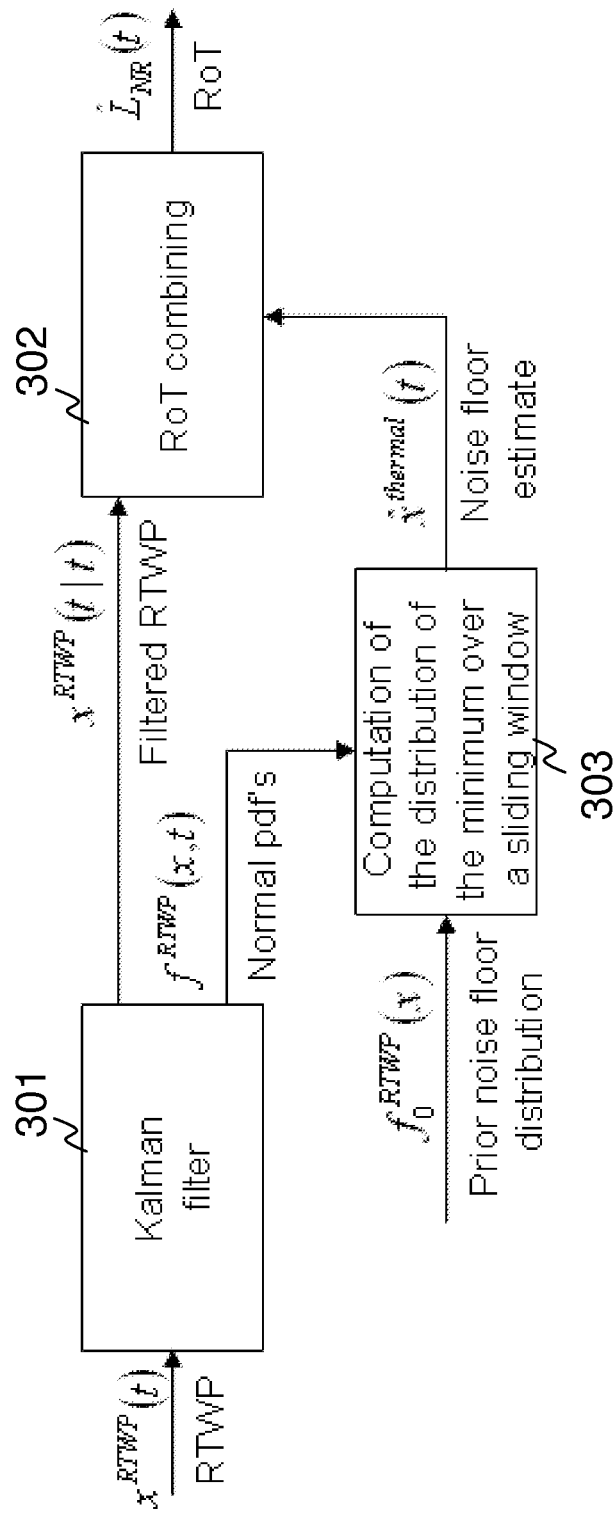
FIG. 3 shows a block diagram of the RoT estimation algorithm.

The RoT estimation algorithm currently in use is depicted in FIG. 3. It is described in detail in [2]. The radio base station 12 comprises a Kalman filter 301. The output, filtered RTWP, from the Kalman filter 301 is sent to a RoT combining block 302. The normal probability density functions (pdf) are sent to a computation block 303, which computes the distribution of the minimum over a sliding window. The thermal noise power floor estimate from the computation block 303 is fed to the RoT combining block 302. The RoT combining block 302 essentially divides the filtered RTWP with the thermal noise power floor estimate.

The algorithm estimates the RoT, as given by equation (1). The main problem solved by the estimation algorithm is the accurate estimation of the thermal noise floor $x^{thermal}(t)$, also referred to as thermal noise power floor or noise floor. Note that one may distinguish between an actual noise floor $N_0(t)$, and an estimate thereof $\hat{x}^{thermal}(t)$. Since it is not possible to obtain exact estimates of this quantity due to the neighbor cell interference, as explained in the section above regarding problem in WCDMA load estimation, the estimator therefore applies an approximation, by consideration of the soft minimum as computed over a relative long window in time.

It is important to understand that this estimation relies on the fact that the thermal noise power floor is effectively constant over very long periods of time, disregarding the small temperature drift.

Recursive Algorithm

The sliding window algorithm of the above section has the disadvantage of requiring a large amount of storage memory. This becomes particularly troublesome in case a large number of instances of the algorithm are needed.

To reduce the memory consumption a recursive algorithm was disclosed in [3] and in the patent application, WO2008041895. That algorithm reduces the memory requirements of the sliding window scheme discussed above at least by a factor of 100-1000.

Tabulation and Search According to Embodiments Herein

Embodiments herein are related to function tabulation, e.g. providing coarse tabulation data. Prior art tabulation techniques are typically focused on achieving high accuracy for functions that are difficult to compute, minimization of table size to optimize look up time is typically not covered. Rather hashing techniques are used, where commonly used table entries are moved around the table to small prioritized areas making the search quicker.

There are also many search algorithms available, one common choice is the binary search algorithm.

The binary search algorithm starts by comparing the mid table entry to the independent variable x. In case the mid table entry is larger than x, the search is constrained to the lower part of the table and a new mid table entry is selected for that half and the procedure is repeated. In case the mid table entry is smaller than x, the search is constrained to the upper part of the table and a new mid table entry is selected for that half and the procedure is repeated. This continues until there is only two adjacent entries remaining.

In case the tabulation entries for the independent variable are linearly distributed, no search is needed. Instead a linear calculation using the independent variable may be used to directly find the table entries between which the independent variable is located. For nonlinearly distributed independent variable table entries, this is no longer possible. For a logarithmically distributed table, tailored to compute e.g. the logarithm, would require transcendental function evaluations to find the table entries in between which the independent variable is located. Hence the tabulated solutions would gain nothing, and it can be concluded that a search is needed, and this search need to be less complex than the evaluation of the function it aims to compute. This is the situation for the embodiments disclosed herein.

The complexity reductions of the embodiments herein are applicable for the algorithms described in section above called Noise floor estimation algorithms in prior art, and algorithms developed from these.

The new computation means, performed in algorithms for estimation of the thermal noise power floor that may also be used in the estimation of the rise over thermal, that are disclosed by embodiments herein are characterized by at least one of:

i) Transcendental function computation by transcendental function tabulation and lookup, said transcendental functions including e.g. 10 log(x), $10^{x/10}$, $\sqrt{x}$, $e^x$, $x^\alpha$, $x^{1-\alpha}$, where $\alpha$ is a parameter and where x is the independent variable.

ii) Dynamic table generation, re-computing tables in response to parameter changes affecting the specific transcendental function, e.g. at a change of $\alpha$, reflecting estimation time constants, the table for $x^\alpha$ and $x^{1-\alpha}$ need to be recomputed.

iii) Coarse tabulation, typically using 2×256 entries for evaluation of each transcendental function at the same time providing a sufficient accuracy when used for thermal noise floor power estimation and rise over thermal estimation.

iv) Range limitation, i.e. limitation of the coarse table to cover only the range relevant for the application of the method. For example, the range may be based on simulation results that may be manually configured or similarly stored at the radio base station 12.

v) Low computational complexity, by
   application of a binary search in said table when computing the value of a transcendental function, by table look-up in the table corresponding to the specific transcendental function, or
   application of a smart stepping scheme applied when a larger number of sequential function evaluations are to be performed, in increasing or decreasing order.

vi) Sufficient accuracy, by application of interpolation, typically linear, between adjacent table entries, for values in between tabulated values.

In iii) above logarithmically distributed table entries are typically used, giving a fixed table resolution per dB, rather than in the linear domain. It is noted that the range needed for the coarse tables may exceed a factor of $10^{20}$—yet only 256 entries are needed. This is a result of a careful selection of the table, to what is needed for thermal noise power floor and rise over thermal estimation. Note that the use of a logarithmically distributed table means that a search algorithm is needed, to find the table entries in between which the independent variable x is located.

The complexity reduction is due to the fact that typical CPUs used for thermal noise power floor and rise over thermal estimation lack hardware support for transcendental function evaluation. Such CPUs therefore perform transcendental function evaluation by means of specific algorithms for this purpose. Since the CPUs are general purpose the transcendental function evaluation needs to be highly accurate over the full range of values supported by the arithmetic system of the CPU. The consequence is that many operations may need to be executed by the CPUs for each transcendental function evaluation, which takes a long time.

The disclosed embodiments herein hence reduce the complexity of the transcendental function evaluation by trading reduced range and accuracy not needed for thermal noise power floor estimation and/or rise over thermal estimation, for a reduced computational effort, resulting in a reduced processing time.

For estimating the noise floor and/or the Rise over thermal a number of building blocks for a method description are disclosed herein.

Building Blocks

Figure 4:
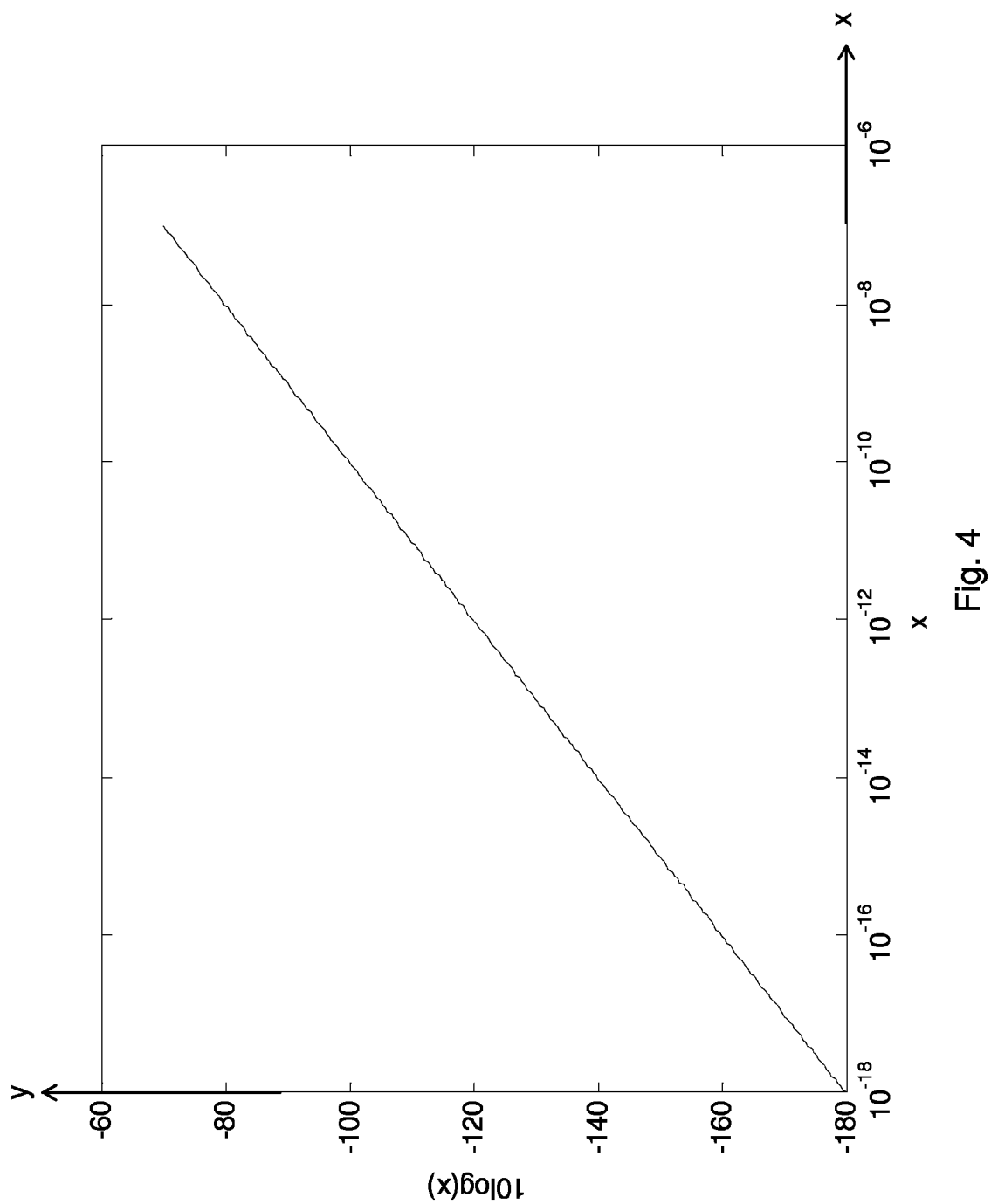
FIG. 4 shows a graph depicting a range and result of 2×256 tabulation of 10 log(x)
Figure 5:
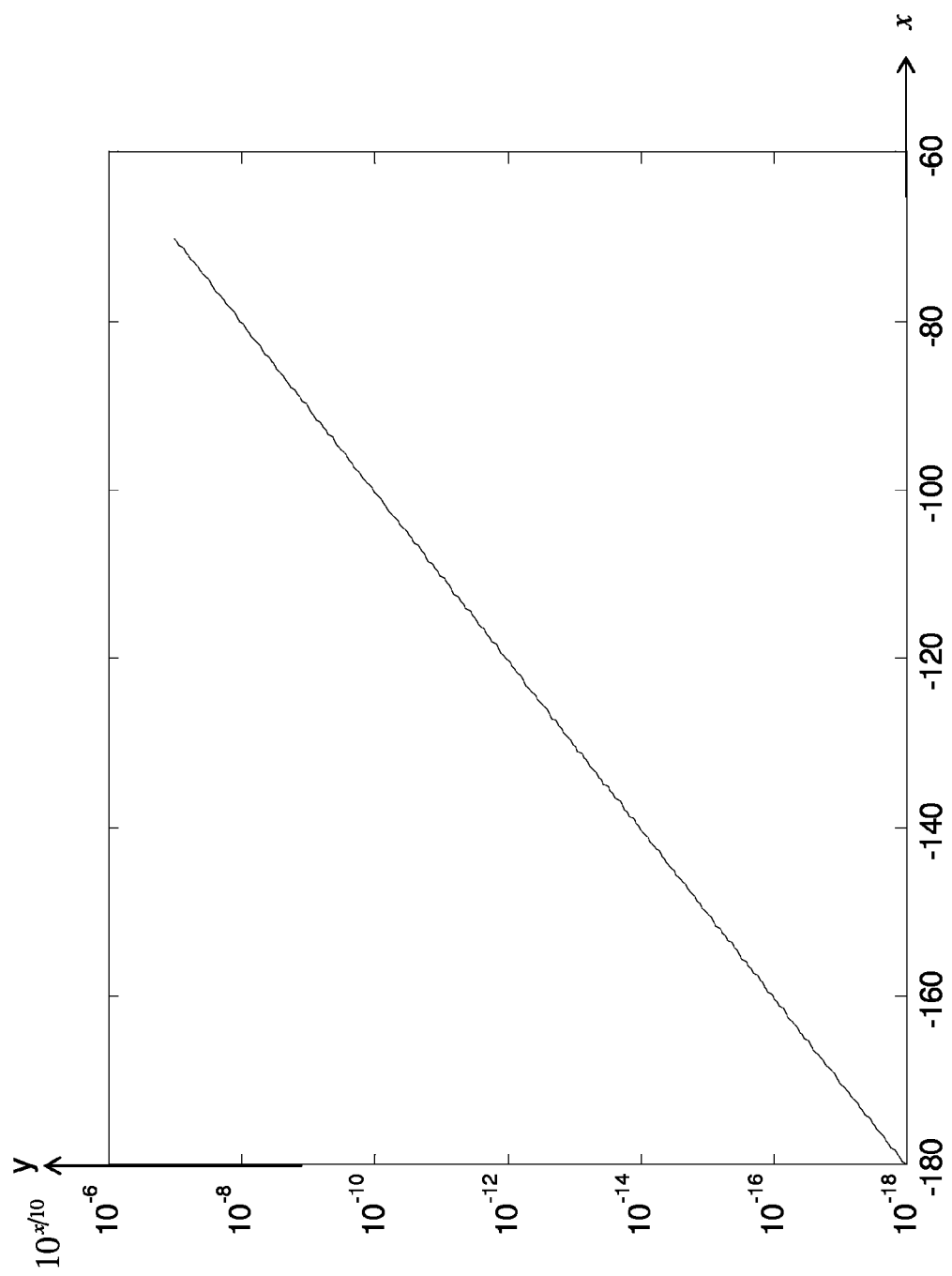
FIG. 5 shows a graph depicting a range and result of 2×256 tabulation of $10^{x/10}$.
Figure 6:
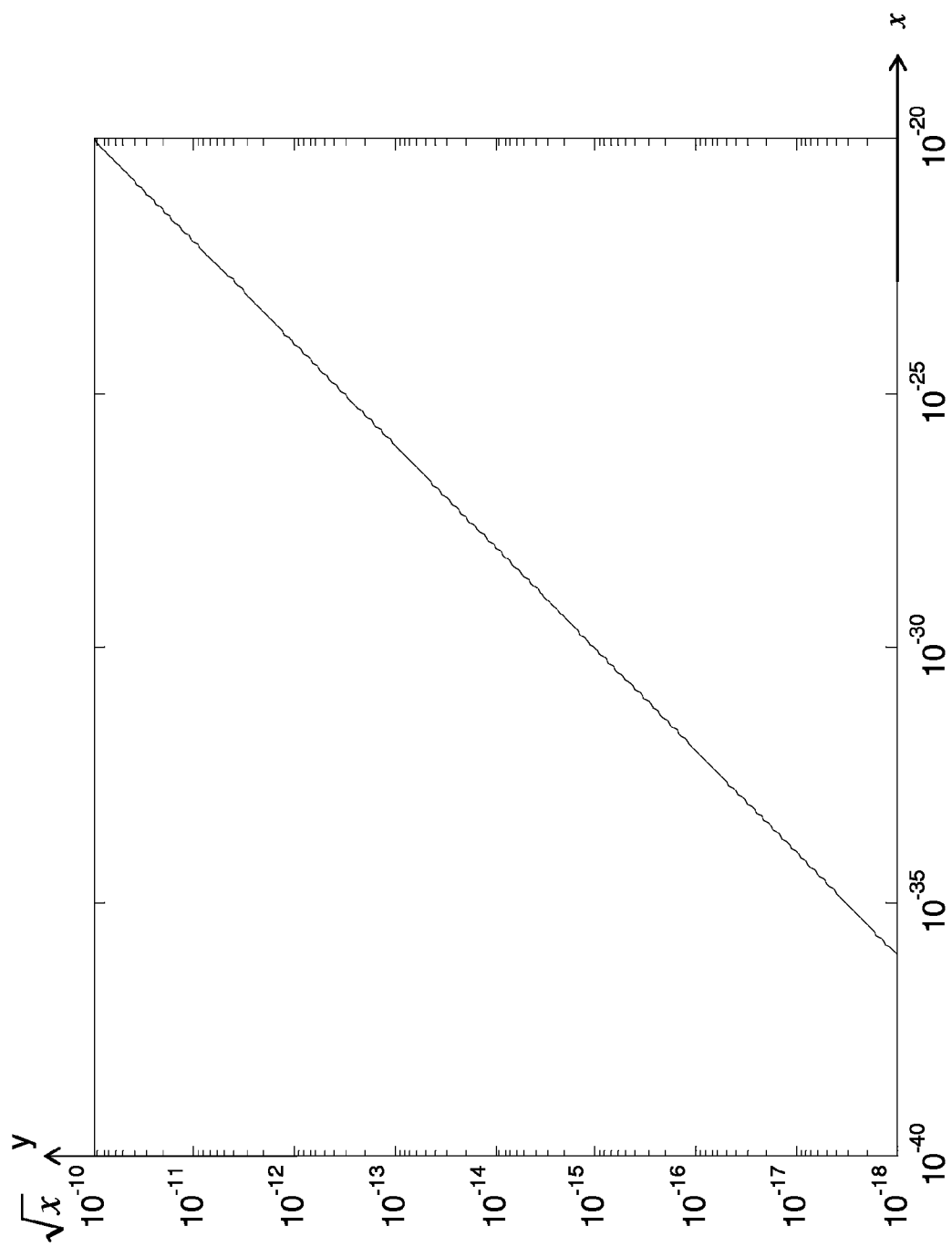
FIG. 6 shows a graph depicting a range and result of 2×256 tabulation of $\sqrt{x}$.
Figure 7:
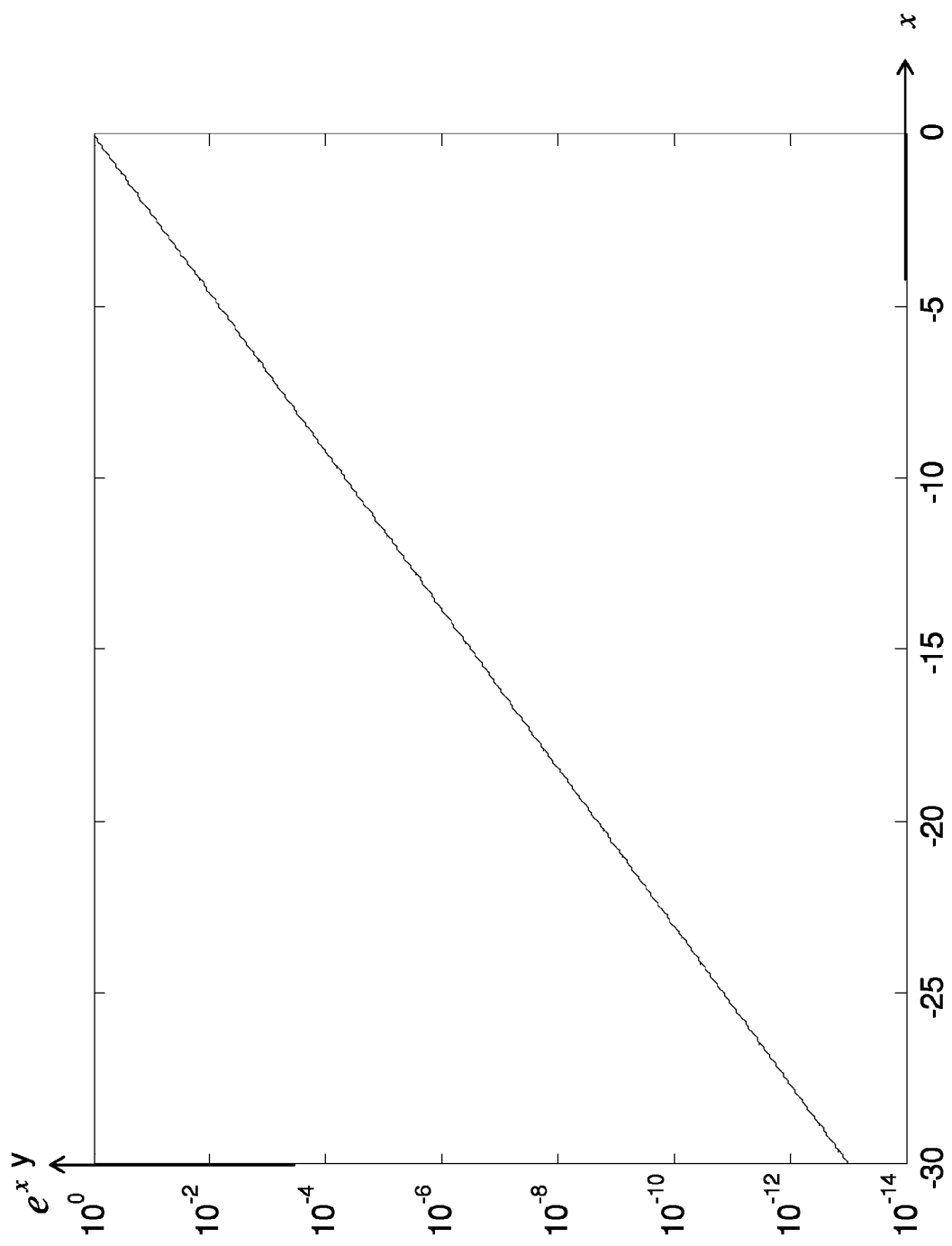
FIG. 7 shows a graph depicting a range and result of 2×1024 tabulation of $e^x$.
Figure 8:
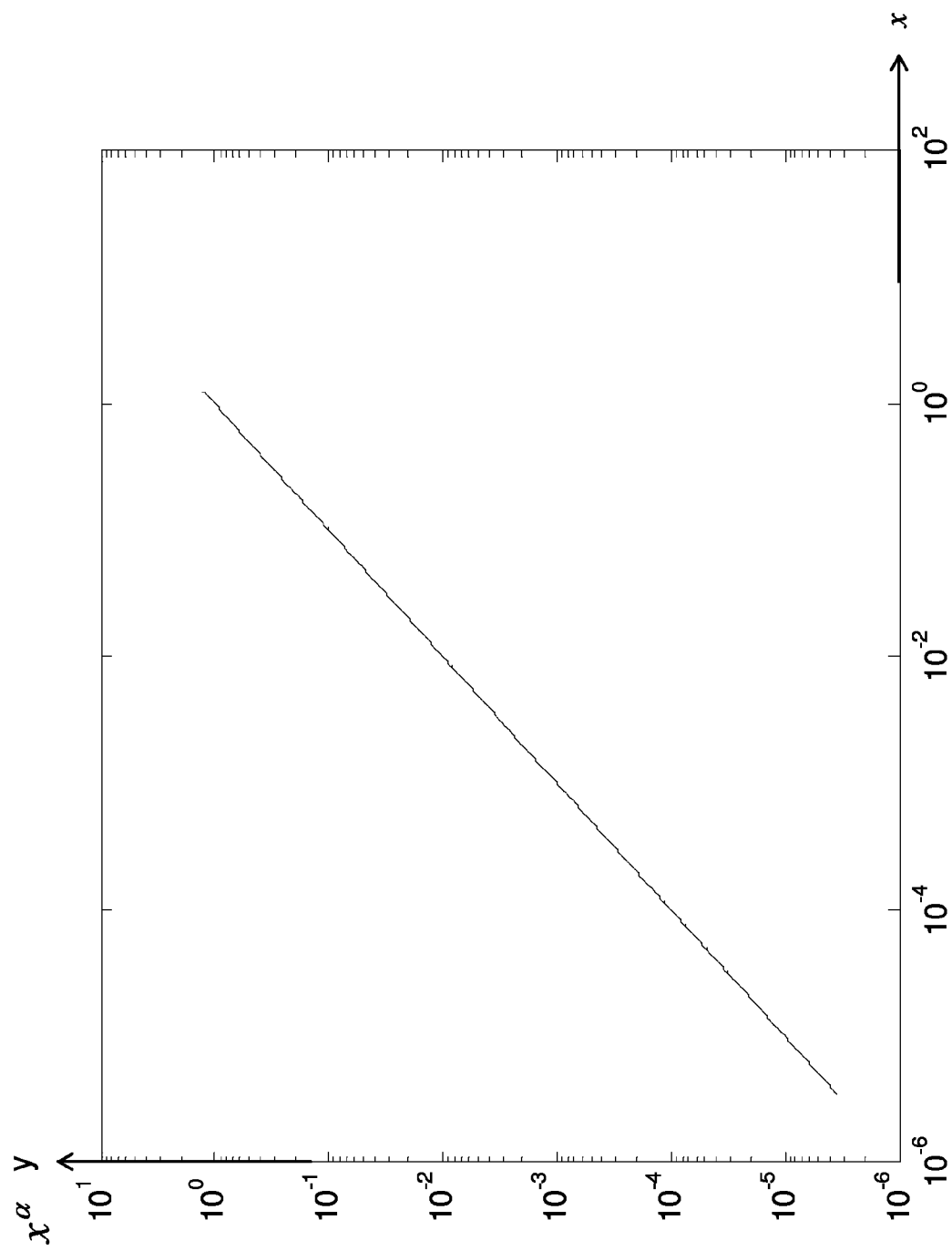
FIG. 8 shows a graph depicting a range and result of 2×1024 tabulation of $x^\alpha$.
Figure 9:
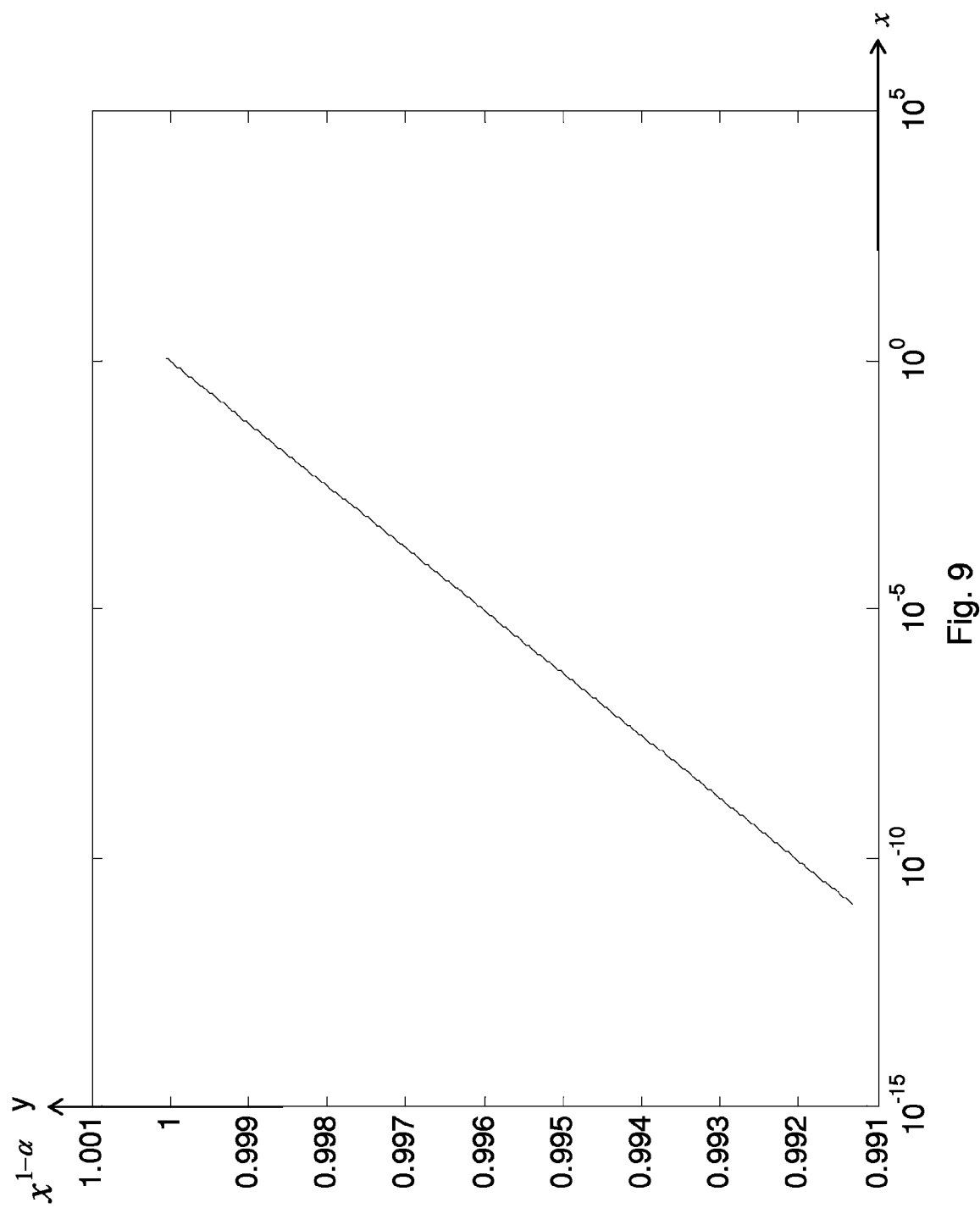
FIG. 9 shows a graph depicting a range and result of 2×1024 tabulation of $x^{1-\alpha}$.

This sub-section describes building blocks of the embodiments herein. These are merged together in section below, to produce two methods Coarse Tabulation Selection for Thermal Noise Power Floor and/or Rise Over Thermal Estimation This sub-section describes the typical selected ranges of the coarse tables, and displays the complete tables graphically. 2×256 or 2×1024 table sizes are used for illustration. FIG. 4 shows a range and result of 2×256 tabulation of 10 log(x). 10 log(x) is defined along a y-axis and x is defined along a horizontal axis. FIG. 5 shows the range and result of 2×256 tabulation of $10^{x/10}$. $10^{x/10}$ is defined along a y-axis and x is defined along a horizontal axis. FIG. 6 shows the range and result of 2×256 tabulation of $\sqrt{x}$. $\sqrt{x}$ is defined along a y-axis and x is defined along a horizontal axis. FIG. 7 shows the range and result of 2×1024 tabulation of $e^x$. $e^x$ is defined along a y-axis and x is defined along a horizontal axis. FIG. 8 shows the range and result of 2×1024 tabulation of $x^{1-\alpha}$, for the time constant $\alpha=0.9997$. $x^{1-\alpha}$ is defined along a y-axis and x is defined along a horizontal axis. FIG. 9 shows the range and result of 2×1024 tabulation of $x^{1-\alpha}$, for the time constant $\alpha=0.9997$. $x^{1-\alpha}$ is defined along a y-axis and x is defined along a horizontal axis.

Dynamic Recalculation at Change of Parameters

Tables for $x^\alpha$ and $x^{1-\alpha}$ are also dependent on the parameter $\alpha$. This parameter is used in [3], to control the time constant of the thermal noise power floor estimator. As a result, operators may wish to reset this parameter during normal operation of the radio base station 12, to tune algorithms.

A problem is that the tables for $x^\alpha$ and $x^{1-\alpha}$ are computed for one selected value of $\alpha$. Hence the tables need to be dynamic, and recomputed when a new value of $\alpha$ is selected. This is a feature of embodiments herein.

Low Complexity Table Look Up Strategies

Binary Search

The starting point is the two column table for the general function $f(x)$ given in Table 1. Here $x_1, \ldots, x_N$ represent the independent variable entries of the table, sorted in increasing/decreasing order, N is the table size, and $f(x_1), \ldots, f(x_N)$ denote the tabulated function values, corresponding to each of the $x_1, \ldots, x_N$.

TABLE 1

Example table for function f(x)

| x | f(x) |
|---|---|
| $x_1$ | $f(x_1)$ |
| $x_2$ | $f(x_2)$ |
| . | . |
| . | . |
| . | . |
| $x_N$ | $f(x_N)$ |

The binary search algorithm is then exemplified for the 10 log(x) case below. MATLAB code implementing functions with binary search are used for illustration. The procedure is equivalent for the other transcendental functions.

The binary search algorithm starts by comparing the mid table entry to the independent variable x. In case the mid table entry is larger than x, the search is constrained to the lower part of the table and a new mid table entry is selected for that half and the procedure is repeated. In case the mid table entry is smaller than x, the search is constrained to the upper part of the table and a new mid table entry is selected for that half and the procedure is repeated. This continues until there is only two adjacent entries remaining.

```
%%%%%%%%%%%%%%%%%%%%%%%%%%%%%%%%%%%%%%%%%%%%%%%%%%%%%%%%%%%%%%%%%%%%%%%%%%%%%%%%
%
% Description: Functions that performs a tabulated computation of
% 10*log10( ), exploiting linear interpolation, i.e. transforming to dBs.
%
% Written by: Torbjorn Wigren, KI/EAB/FJW/SNU
%
% Revision: A - First version
%
% Date: A - 2012-04-12
%
%%%%%%%%%%%%%%%%%%%%%%%%%%%%%%%%%%%%%%%%%%%%%%%%%%%%%%%%%%%%%%%%%%%%%%%%%%%%%%%%
function [ powerdB ] = logTab(power)
global logTable;
logTableSize=size(logTable,1);
if (power<=logTable(1,1)) % below lower range limit
     powerdB=logTable(1,2);
elseif (power>=logTable(logTableSize,1)) % above upper range limit
     powerdB=logTable(logTableSize,2);
else % binary search
     searchPointer = logTableSize/2; %   Place pointer in the middle of the
                                        table
     searchPointerUpdate = searchPointer/2;
     found=0;
     while (~found) % not ready
         if (power==logTable(searchPointer)) % Found the entry precisely?
              found=1;
         elseif ((power>logTable(searchPointer,1)) &
         (power<=logTable(searchPointer+1,1))) % Found the
                                                 adjacent entries?
              found=1;
         elseif (power>=logTable(searchPointer,1)) %   Search upper half of
                                                       table
              searchPointer=searchPointer+searchPointerUpdate;
              searchPointerUpdate=searchPointerUpdate/2;
         else % Search lower half of table
              searchPointer=searchPointer-searchPointerUpdate;
         searchPointerUpdate=searchPointerUpdate/2;
         end
     end
     if (found)
         powerdB=logTable(searchPointer,2)+(logTable(searchPointer+1,2)-
         logTable(searchPointer,2))*(power-
         logTable(searchPointer,1))/(logTable(searchPointer+1,1)-
         logTable(searchPointer,1)); % Interpolate
     end
end
```

Smart Stepping

This search method is used in case a number of the same transcendental function evaluation are to be computed in order, for increasing or decreasing values of the independent variable. The procedure is then to start at one end of the table and traverse it to the other end, thereby significantly limiting the search. The procedure is illustrated for the update of a cumulative probability distribution function that appears in the updating of the algorithm of recursive noise floor estimation in WCDMA disclosed in [3]. The procedure is exemplified with the following MATAB code. Reference is made to actions in the FIGS. 11-14.

```
%%%%%%%%%%%%%%%%%%%%%%%%%%%%%%%%%%%%%%%%%%%%%%%%%%%%%%%%%%%%%%%%%%%%%%%
% Recursive update and limitation of gammaCdf. Table look up and
% interpolation is used, exploiting the fact that the two involved arrays
% are reversed CDFs, i.e. decreasing functions of the indices. This
% allows an efficient update of all probability bins.
%%%%%%%%%%%%%%%%%%%%%%%%%%%%%%%%%%%%%%%%%%%%%%%%%%%%%%%%%%%%%%%%%%%%%%%
- Action 1304 starts
thisGammaTableIndex=0; % Keeps track of alpha table location of present
                        bin
thisRevPowerTableIndex=0; % Keeps track of revAlpha table location of
                        present bin
            for j=0:powerGridSize-1
                if (powAlphaTablesEnabled==0) % Is tabulation enabled?
                    gammaCdf(1,j+1)=(gammaCdf(1,j+1)^alpha)*
                        (revPowerCdf(1,j+1))^revAlpha;
                else
                    if (gammaCdf(1,j+1)==powTableAlpha(thisGammaTableIndex+1,1)) %
                                                First factor of update
        powGammaCdfAlpha=powTableAlpha(thisGammaTableIndex+1,1);
    else
        while (((gammaCdf(1,j+1)<
                powTableAlpha(thisGammaTableIndex+1,1))) &
                (thisGammaTableIndex<powTableAlphaSize-1))
            thisGammaTableIndex=thisGammaTableIndex+1;
        end
        upperGammaEntry=powTableAlpha(thisGammaTableIndex+1,1); %
                                        Prepare for interpolation...
        upperPowGammaEntry=powTableAlpha(thisGammaTableIndex+1,2);
        thisGammaTableIndex=thisGammaTableIndex-1; %       Index is now
                                                        right above
        lowerGammaEntry=powTableAlpha(thisGammaTableIndex+1,1);
        lowerPowGammaEntry=powTableAlpha(thisGammaTableIndex+1,2);
        powGammaCdfAlpha=lowerPowGammaEntry+(upperPowGammaEntry-
            lowerPowGammaEntry)*(gammaCdf(1,j+1)-
            lowerGammaEntry)/(upperGammaEntry-lowerGammaEntry); %
                                                            Interpolate
    end
    if (revPowerCdf(1,j+1)==0.0) % Second factor of update
        powRevPowerCdfRevAlpha=0.0;
    elseif (revPowerCdf(1,j+1)==powTableRevAlpha
            (thisRevPowerTableIndex+1,1))
        powRevPowerCdfRevAlpha=powTableRevAlpha
            (thisRevPowerTableIndex+1,1);
    else
        while (((revPowerCdf(1,j+1)<powTableRevAlpha
                (thisRevPowerTableIndex+1,1))) &
                (thisRevPowerTableIndex<powTableRevAlphaSize-1))
            thisRevPowerTableIndex=thisRevPowerTableIndex+1;
        end
        upperRevPowerEntry=powTableRevAlpha
            (thisRevPowerTableIndex+1,1); %        Prepare for
                                                    interpolation...
        upperPowRevPowerEntry=powTableRevAlpha
            (thisRevPowerTableIndex+1,2);
        thisRevPowerTableIndex=thisRevPowerTableIndex-1; % Index is
                                                    now right above
        lowerRevPowerEntry=powTableRevAlpha
            (thisRevPowerTableIndex+1,1);
        lowerPowRevPowerEntry=powTableRevAlpha
            (thisRevPowerTableIndex+1,2);
        powRevPowerCdfRevAlpha=lower PowRevPowerEntry+
            (upperPowRevPowerEntry-lowerPowRevPowerEntry)*
            (revPowerCdf(1,j+1)-lowerRevPowerEntry)/
            (upperRevPowerEntry-lowerRevPowerEntry);
                                                % Interpolate
    end
    gammaCdf(1,j+1)=powGammaCdfAlpha*powRevPowerCdfRevAlpha; %
                                                Perform update
end
if (gammaCdf(1,j+1)<fractionalDistributionFloor)
    gammaCdf(1,j+1)=fractionalDistributionFloor;      % Limitation also of
                                                gammaCdf in order to
                                            allow probability peaks to grow at
                                                alternative grid points
        end
        if gammaCdf(1,j+1)>1.0;
            gammaCdf(1,j+1)=1.0;
        end
end
- Action 1304 ends
```

Methods

Methods are now described for the implementation in an existing RBS 12, such as macro a RBS and in an EPIC micro base station. The method in future macro RBSs is expected to be changed to the Epic case in future projects. The methods are described in terms of major steps and in terms of MATLAB code. Note that the code has functionality to select between a normal transcendental function evaluation and one based on the tabulation techniques of embodiments herein.

The description is made with reference to the existing algorithms, and all steps or actions at which techniques disclosed herein are used, are noted separately. Only code showing the use of the tabulation solutions of embodiments herein is included.

The description below lists all steps or actions where the disclosed embodiments are used in the parts of the current code covered by the application. It should be understood that not all steps need to be present in all embodiments but this is merely exemplifications of some embodiments.

In a Current Macro RBS

Main Steps—Thermal Noise Power Floor Estimation

Step 1: Coarse tables for $10 \log(x)$, $10^{x/10}$, $\sqrt{x}$, $e^x$, are either computed or pre-loaded in static memory before start of the thermal noise power floor estimation algorithm of [2]. The independent variable of the tables are typically logarithmically distributed.

Step 2: As a main step of the algorithm of [2] (see that publication for details) the Gaussian probability distribution function for the current RTWP power sample is computed over a power grid. The table for $e^x$ based on a binary search is used for this purpose.

Step 3: The remaining steps of the thermal noise power floor estimation algorithm of [2] is run.

Code—Thermal Noise Power Floor Estimation

Step 1

```
global logTable powTable sqrtTable expTable; - Action 1101 starts
%
% Computation of tables - Action 11011 starts
%
logTable=logspace(-18,-7,1024);
logTable=logTable';
logTable=[logTable 10*log10(logTable)];
save logTable.txt logTable -double -ASCII;
powTable=[logTable(:,2) logTable(:,1)];
save powTable.txt powTable -double -ASCII;
sqrtTable=logspace(-36,0,1024);
sqrtTable=sqrtTable';
sqrtTable=[sqrtTable sqrt(sqrtTable)];
save sqrtTable.txt sqrtTable -double -ASCII;
expTable=(-30:(30/511):0);
expTable=expTable';
expTable=[expTable exp(expTable)];
save expTable.txt expTable -double -ASCII;
- Action 11011 ends
%%%%%%%%%%%%%%%%%%%%%%%%%%%%%%%%
% Loading of function tables - Action 11012 starts
%%%%%%%%%%%%%%%%%%%%%%%%%%%%%%%%
load logTable.txt -ASCII; % Load log (base 10) table - an identical table
                                is to be used in the C++ code
load powTable.txt -ASCII; % Load pow (base 10) table - an identical table
                                is to be used in the C++ code
load sqrtTable.txt -ASCII; % Load pow (base 10) table - an identical
                                table is to be used in the C++ code
load expTable.txt -ASCII; % Load exp (base e) table - an identical table
                                is to be used in the C++ code
- Action 11012 ends
- Action 1101 ends
```

Step 2

```
%
% Compute powerPdf smart - by avoiding exp where it is not needed, and
% using exp tabulation where needed
%
if (useLogTable == 0)
     startIndex=floor((10*log10(RTWPUpdate)+30-
        logarithmicPowerGrid(1,1))/powerPdfDiscretizationDb);
else
     startIndex=floor((logTab(RTWPUpdate)+30-
        logarithmicPowerGrid(1,1))/powerPdfDiscretizationDb);
end
if (startIndex<0)
     startIndex=0;
elseif (startIndex>powerGridSize-1)
     startIndex=powerGridSize-1;
else
end
maxGaussArgument=powerGrid(1,startIndex+1)-RTWPUpdate;
breakQuotient=log(1e-16);
if (useSqrtTable == 0)
     argumentLimit=sqrt(maxGaussArgument*maxGaussArgument-
2*RTWPStandardDeviationUpdate*RTWPStandardDeviationUpdate*breakQuotient);
else
     argumentLimit=sqrtTab(maxGaussArgument*maxGaussArgument-
2*RTWPStandardDeviationUpdate*RTWPStandardDeviationUpdate*breakQuotient);
end
for j=startIndex:powerGridSize-1
     tmp1=powerGrid(1,j+1)-RTWPUpdate;
     if (abs(tmp1)<argumentLimit)
         if (useExpTable == 0) - part 1 Action 1102 starts
             powerPdf(circularBufferCounter+1,j+1)=
             (1/(sqrt(2*pi)*RTWPStandardDeviationUpdate))*exp(-
             (tmp1)^2/(2*(RTWPStandardDeviationUpdate^2)));
         Else - part 1 Action 1102 ends
             powerPdf(circularBufferCounter+1,j+1)=(1/(sqrt(2*pi)*
             RTWPStandardDeviationUpdate))*expTab(-(tmp1)^2/
             (2*(RTWPStandardDeviationUpdate^2)));
         end
```

```
    else
        powerPdf(circularBufferCounter+1,j+1)=0.0;
    end
end
for j=startIndex:-1:0
    tmp1=powerGrid(1,j+1)-RTWPUpdate;
    if (abs(tmp1)<argumentLimit)
        if (useExpTable == 0) - part 2 Action 1102 starts
            powerPdf(circularBufferCounter+1,j+1)=
            (1/(sqrt(2*pi)*RTWPStandardDeviationUpdate))*exp(-
            (tmp1)^2/(2*RTWPStandardDeviationUpdate^2)));
        Else - part 2 Action 1102 starts
            powerPdf(circularBufferCounter+1,j+1)=
            (1/(sqrt(2*pi)*RTWPStandardDeviationUpdate))*expTab(-
            (tmp1)^2/(2*RTWPStandardDeviationUpdate^2)));
        end
    else
        powerPdf(circularBufferCounter+1,j+1)=0.0;
    end
end
```

Main Steps—Rise Over Thermal Estimation

Step 1: The RTWP measurement is transformed from dBms to linear power in watts, using the table for $10^{x/10}$.

Step 2: The Kalman filter of the algorithm of [2] is run.

Step 3: The standard deviation is computed by application of the table for $\sqrt{x}$.

Step 4: The RoT is computed by application of the table for $10^{x/10}$, applied in multiple locations in the RoT calculation block. Note: The RoT calculation also uses the current value of the thermal noise power floor estimate, as obtained in sections above.

Code—Rise Over Thermal Estimation

Step 1

```
%%%%%%%%%%%%%%%%%%%%%%%%%%%%%%%%%%%%%%%%%%%%%%%%%%%%
% updateKalman, complexity reduced with coarse tabulation
%%%%%%%%%%%%%%%%%%%%%%%%%%%%%%%%%%%%%%%%%%%%%%%%%%%%
%
% One step of the Kalman iteration
%
if (usePowTable==0)
    RTWPLinear=10^(-3)*10^(RTWP(1,floor(t/tEul+0.1)+1)/10); % Measurement
                                                input and transformation to the linear domain [W]
else - Action 1201 starts
    RTWPLinear=0.001*powTab(RTWP(1,floor(t/tEul+0.1)+1)); % Measurement
                                                input and transformation to the linear domain [W]
end - Action 1201 ends
```

Step 3

```
if (useSqrtTable==0)
    RTWPStandardDeviationUpdate=sqrt(RTWPVarianceUpdate);
Else - Action 1203 starts
    RTWPStandardDeviationUpdate=sqrtTab(RTWPVarianceUpdate);
End - Action 1203 ends
```

Step 4

```
%%%%%%%%%%%%
% updateRoT
%%%%%%%%%%%%
%
% One step of the RoTCalculation
%
appliedOptimalNoiseFloorEstimate=optimalNoiseFloorEstimate;
%
% Safety net 1
%
if (t<tStartRoTEstimation+eulSlidingWindowTime+block0Delay-tEul) % Block
                                                0 change in Lindholmen.
%if (t<tStartRoTEstimation+eulSlidingWindowTime-tEul+block0Delay) % Block
                                                0 change in Lindholmen.
```

```
        if (usePowTable == 0)
            appliedOptimalNoiseFloorEstimate=10^(-
            3)*10^((eulThermalLevelPrior-eulSafetyNet1Margin)/10);
        Else - part 1 Action 1204 starts
            appliedOptimalNoiseFloorEstimate=0.001*
            powTab((eulThermalLevelPrior-eulSafetyNet1Margin));
        end - part 1 Action 1204 ends
%
% Safety net 2
%
else
    if mod(counter-0*block0CounterDelay,
        fix(floor(eulPowerSamplingSpacing/tEul)+0.1))==0; % Noise floor
                        update performed, only then new minimum is required
        minOverSafetyNet2Buffer=min(safetyNet2Buffer
        (1:currentNumberOfSamplesInSafetyNet2Buffer,1));
    end
    if exist('minOverSafetyNet2Buffer')
        if (usePowTable == 0)
            if (optimalNoiseFloorEstimate/minOverSafetyNet2Buffer>
                10^(maxRoTIncrease/10))appliedOptimalNoiseFloorEstimate=
                minOverSafetyNet2Buffer*10^(maxRoTIncrease/10);
            end
        else - part 2 Action 1204 starts
            RoTIncreaseLimit = powTab(maxRoTIncrease);
            if (optimalNoiseFloorEstimate/minOverSafetyNet2Buffer>
                RoTIncreaseLimit) appliedOptimalNoiseFloorEstimate=
                minOverSafetyNet2Buffer*RoTIncreaseLimit;
            end
        end - part 2 Action 1204 ends
    end
end
%
% Update buffer in case the noise floor has been updated
%
if mod(counter+1*block0CounterDelay,
    fix(floor(eulPowerSamplingSpacing/tEul)+0.1))==0;    % Noise floor
                                                        update performed
    currentNumberOfSamplesInSafetyNet2Buffer=
    min([currentNumberOfSamplesInSafetyNet2Buffer+1
    fix(floor((timeOldRoT/eulPowerSamplingSpacing)+0.1))]);%%%%%%%%%%%%%%
                        Reduced upper limit with 1
    circularBufferCounterForSafetyNet2=
    mod(circularBufferCounterForSafetyNet2+1,'
    fix(floor((timeOldRoT/eulPowerSamplingSpacing)+0.1))); %%%%%%%%%%%%%%
                                    Reduced upper limit with 1
    safetyNet2Buffer(circularBufferCounterForSafetyNet2+1,1)=
    optimalNoiseFloorEstimate;
end
%%%%%
% Compute result
%%%%%
RoTEstimate=RTWPUpdate/appliedOptimalNoiseFloorEstimate;
```

Embodiments Wherein EPIC Micro RBS and Future Macro RBSs are Modified/Used

Main Steps—Thermal Noise Power Floor Estimation

Step 1: Coarse tables for $10\log(x)$, $10^{x/10}$, $\sqrt{x}$, are either computed or pre-loaded in fix memory before start of the thermal noise power floor estimation algorithm of [3]. The independent variables of the tables are typically logarithmically distributed. Thus, coarse tables for $10\log(x)$, $10^{x/10}$, $\sqrt{x}$, are used as in the embodiments above.

Step 2: Coarse tables for $x^{\alpha}$ and $x^{1-\alpha}$ are computed and stored in a dynamic memory, before start of the thermal noise power floor estimation algorithm of [3]. The independent variables of the tables are typically logarithmically distributed. Note that step 2 may optionally be repeated during run-time in case the parameter $\alpha$ is changed.

Step 3: A first part of the estimation algorithm of [3] is run.

Step 4: An update of the cumulative probability distribution of the minimum (one major part of the thermal noise floor estimation algorithm) is performed using smart stepping (see above).

Step 5: A second part of the estimation algorithm of [3] is run.

Step 6: Updated estimates of the thermal noise power floor and of the corresponding standard deviation are computed by means of the tables for $10\log(x)$ and $\sqrt{x}$.

Code—Thermal Noise Power Floor Estimation

Step 1

```
%%%%%%%%%%%%%%%%%%%%%%%%%%%%%%%%%%%%%%%%%%%%%%%%%%%%%%%%%%%%%%%%%%
%
% Description: Script that initializes static tables for certain
% transcendental functions
%
```

-continued

```
% Written by: Torbjorn Wigren, KI/EAB/FJW/SNU
%
% Revision:   A - First version for recursive noise floor estimation
%             B - Added sqrt table and concluded that 256/512 entries in
%               the tables are enough to avoid losses, 64 entries give an
%               accuracy impairment of about 1 dB in the neighbor cell
%               interference estimate.%
% Date:   A - 2012-04-12
%         B - 2012-04-13
%
%%%%%%%%%%%%%%%%%%%%%%%%%%%%%%%%%%%%%%%%%%%%%%%%%%%%%%%%%%%%%%%%
global logTable powTable sqrtTable;
%%%%%%%%%%%%%%%%%%%%%%%%%%%%%%%%%%%%%%%
% Computation of dynamic tables - Action 1301 starts
%%%%%%%%%%%%%%%%%%%%%%%%%%%%%%%%%%%%%%%
logTable=logspace(-18,-7,256); Action 13011 starts
logTable=logTable';
logTable=[logTable 10*1og10(logTable)];
save logTable.txt logTable -double -ASCII;
powTable=[logTable(:,2) logTable(:,1)];
save powTable.txt powTable -double -ASCII;
sqrtTable=logspace(-36,-20,256);
sqrtTable=sqrtTable';
sqrtTable=[sqrtTable sqrt(sqrtTable)];
save sqrtTable.txt sqrtTable -double -ASCII; Action 13011 ends
%%%%%%%%%%%%%%%%%%%%%%%%%%%%%%%%%%%
% Loading of function tables Action 13012 starts
%%%%%%%%%%%%%%%%%%%%%%%%%%%%%%%%%%%
load logTable.txt -ASCII; % Load log (base 10) table -
                          an identical table is to be used in the C++ code
load powTable.txt -ASCII; % Load pow (base 10) table -
                          an identical table is to be used in the C++ code
load sqrtTable.txt -ASCII; % Load pow (base 10) table -
                          an identical table is to be used in the C++ code
- Action 13012 ends
- Action 1301 ends
```

Step 2

```
%%%%%%%%%%%%%%%%%%%%%%%%%%%%%%%%%%
% Computation of dynamic tables
%%%%%%%%%%%%%%%%%%%%%%%%%%%%%%%%%%
 - Action 1302 (or action 1602) starts
powTableAlpha=logspace(0.1,log10(fractionalDistributionFloor)/1.1,1024);
powTableAlpha=powTableAlpha';
powTableAlpha=[powTableAlpha powTableAlpha.^(alpha)];
save powTableAlpha.txt powTableAlpha -double -ASCII;
powTableAlphaSize=size(powTableAlpha,1);
powTableRevAlpha=logspace(0.1,2*log10(fractionalDistributionFloor)/1.1,1024);
powTableRevAlpha=powTableRevAlpha';
powTableRevAlpha=[powTableRevAlpha powTableRevAlpha.^(revAlpha)];
save powTableRevAlpha.txt powTableRevAlpha -double -ASCII;
powTableRevAlphaSize=size(powTableRevAlpha,1);
%%%%%%%%%%%%%%%%%%%%%%%%%%%%%%%%%%%
% Loading of function tables (Action 1601)
%%%%%%%%%%%%%%%%%%%%%%%%%%%%%%%%%%%
tableResolutionExpAndErfc=0.01; % The resolution of the tables
load erfcTable.txt -ASCII; % Load erfc table -
                          an identical table is to be used in the C++ code
load expSquareTable.txt -ASCII; % Load exp (base e) table -
                          an identical table is to be used in the C++ code
load powTableAlpha.txt -ASCII; % Load x^alpha function table -
                          an identical table is to be used in the C++ code
load powTableRevAlpha.txt -ASCII; % Load x^(1-alpha) function table -
                          an identical table is to be used in the C++ code
- Action 1302 (Action 1602) ends
```

Step 4

```
%%%%%%%%%%%%%%%%%%%%%%%%%%%%%%%%%%%%%%%%%%%%%%%%%%%%%%%%%%%%%%%%%%%
% Recursive update and limitation of gammaCdf. Table look up and
% interpolation is used, exploting the fact that the two involved arrays
```

-continued

```
% are reversed CDFs, i.e. decreasing functions of the indices. This
% allows an efficient update of all probability bins.
%%%%%%%%%%%%%%%%%%%%%%%%%%%%%%%%%%%%%%%%%%%%%%%%%%%%%%%%%%%%%%%%%%%%%%
- Action 1304 starts, corresponds to the smart stepping action
thisGammaTableIndex=0; % Keeps track of alpha table location of present
                         bin
thisRevPowerTableIndex=0; % Keeps track of revAlpha table location of
                         present bin
for j=0:powerGridSize-1
    if (powAlphaTablesEnabled==0) % Is tabulation enabled?
gammaCdf(1,j+1)=(gammaCdf(1,j+1)^alpha)*(revPowerCdf(1,j+1))^revAlpha;
    else
        if (gammaCdf(1,j+1)==powTableAlpha(thisGammaTableIndex+1,1))
                                       % First factor of update
            powGammaCdfAlpha=powTableAlpha(thisGammaTableIndex+1,1);
        else
            while (((gammaCdf(1,j+1)<powTableAlpha
                    (thisGammaTableIndex+1,1))) &
                       (thisGammaTableIndex<powTableAlphaSize-1))
                    thisGammaTableIndex=thisGammaTableIndex+1;
            end
            upperGammaEntry=powTableAlpha(thisGammaTableIndex+1,1);
                                       % Prepare for interpolation...
            upperPowGammaEntry=powTableAlpha(thisGammaTableIndex+1,2);
            thisGammaTableIndex=thisGammaTableIndex-1; % Index is now
                                                    right above
            lowerGammaEntry=powTableAlpha(thisGammaTableIndex+1,1);
            lowerPowGammaEntry=powTableAlpha(thisGammaTableIndex+1,2);
            powGammaCdfAlpha=lowerPowGammaEntry+(upperPowGammaEntry-
            lowerPowGammaEntry)*(gammaCdf(1,j+1)-
            lowerGammaEntry)/(upperGammaEntry-lowerGammaEntry);
                                                    % Interpolate
        end
        if (revPowerCdf(1,j+1)==0.0) % Second factor of update
            powRevPowerCdfRevAlpha=0.0;
        elseif (revPowerCdf(1,j+1)==powTableRevAlpha
                    (thisRevPowerTableIndex+1,1))
                powRevPowerCdfRevAlpha=
                powTableRevAlpha(thisRevPowerTableIndex+1,1);
        else
            while (((revPowerCdf(1,j+1)<
                    powTableRevAlpha(thisRevPowerTableIndex+1,1))) &
                       (thisRevPowerTableIndex<powTableRevAlphaSize-1))
                    thisRevPowerTableIndex=thisRevPowerTableIndex+1;
            end
            upperRevPowerEntry=powTableRevAlpha
            (thisRevPowerTableIndex+1,1); % Prepare for interpolation
            upper PowRevPowerEntry=powTableRevAlpha
            (thisRevPowerTableIndex+1,2);
            thisRevPowerTableIndex=thisRevPowerTableIndex-1; % Index is
                                                    now right above
            lowerRevPowerEntry=powTableRevAlpha
            (thisRevPowerTableIndex+1,1);
            lowerPowRevPowerEntry=powTableRevAlpha
            (thisRevPowerTableIndex+1,2);
            powRevPowerCdfRevAlpha=lower PowRevPowerEntry+
            (upperPowRevPowerEntry-lowerPowRevPowerEntry)*
            (revPowerCdf(1,j+1)-lowerRevPowerEntry)/(upperRevPowerEntry-
              lowerRevPowerEntry);
                         % Interpolate
        End
        gammaCdf(1,j+1)=powGammaCdfAlpha*powRevPowerCdfRevAlpha;
                                       % Perform update
    end
    if (gammaCdf(1,j+1)<fractionalDistributionFloor)
        gammaCdf(1,j+1)=fractionalDistributionFloor; % Limitation also of
                                       gammaCdf in order to allow probability
                                       peaks to grow at alternative grid points
    end
    if gammaCdf(1,j+1)>1.0;
        gammaCdf(1,j+1)=1.0;
    end
end
- Action 1304 ends
```

Step 6

```
%%%%%%%%%%%%%%%%%%%%%%%%%%%%%%%%%%%%%%%%
% Transform to dBm, for further processing
%%%%%%%%%%%%%%%%%%%%%%%%%%%%%%%%%%%%%%%%
- Action 1306 starts
if (logTableEnabled==0)
    estimatedOptimalNoiseFloorDb=
       10*log10(abs(optimalNoiseFloorEstimate))+30;% In dBm
    if (sgrtTableEnabled==0)
        estimatedOptimalNoiseFloorStandardDeviationDb=
           10*log10(sgrt(optimalNoiseFloorVariance))+30; %   In
                                                             dBm
    else
        estimatedOptimalNoiseFloorStandardDeviationDb=
           10*log10(sgrtTab(optimalNoiseFloorVariance))+30;  %
                                                             In dBm
    end
else
    estimatedOptimalNoiseFloorDb=
       logTab(abs(optimalNoiseFloorEstimate))+30; % In dBm
    if (sqrtTableEnabled==0)
        estimatedOptimalNoiseFloorStandardDeviationDb=
           logTab(sqrt(optimalNoiseFloorVariance))+30; %     In
                                                             dBm
    else
        estimatedOptimalNoiseFloorStandardDeviationDb=
           logTab(sqrtTab(optimalNoiseFloorVariance))+30; %  In
                                                             dBm
    end
end
- Action 1306 ends
```

Main Steps—Rise Over Thermal Estimation
Step 1: The RTWP measurement is transformed from dBms to linear power in watts, using the table for $10^{x/10}$.
Step 2: The Kalman filter of the algorithm of [3] is run.
Step 3: The standard deviation is computed by application of the tables for $10^{x/10}$ and $\sqrt{x}$.
Step 4: The RoT is computed as is. No table impact.
Code—Rise Over Thermal Estimation
Step 1

```
%%%%%%%%%%%%%%%%%%%%%%%%%%%%%%%%%%%%%%
% One step of the Kalman iteration
%%%%%%%%%%%%%%%%%%%%%%%%%%%%%%%%%%%%%%
if ((RTWP(1,floor(t/tEul+0.1)+1) > lowerInputLimitRTWP) &
```

-continued

```
       (RTWP(1,floor(t/tEul+0.1)+1) < upperInputLimitRTWP)) %
                                                             Check input
    if (powTableEnabled==0)
        RTWPLinear=10^(-3)*10^(RTWP(1,floor(t/tEul+0.1)+1)/10); %
                                                Measurement input and transformation
                                                to the linear domain [W]
    else - Action 1401 starts
        RTWPLinear=0.001*powTab(RTWP(1,floor(t/tEul+0.1)+1)); %
                                                Measurement input and transformation to
                                                the linear domain [W]
end - Action 1401 ends
```

Step 3

```
- Action 1403 starts
if (powTableEnabled==0)
    if (sqrtTableEnabled==0)
        RTWPStandardDeviationUpdate=(10^(3)*10^(meanPowerLevel/10))
           /nominalMeanPowerLevel*sqrt(abs(RTWPVarianceUpdate));
                                                       % Scaling
                                       - needed for noise floor estimation block
    else
        RTWPStandardDeviationUpdate=(10^(3)*10^(meanPowerLevel/10))
           /nominalMeanPowerLevel*sqrtTab(abs(RTWPVarianceUpdate)); %
                                                       Scaling - needed
                                       for noise floor estimation block
    end
else
    if (sqrtTableEnabled==0)
        RTWPStandardDeviationUpdate=0.001*powTab(meanPowerLevel)
           /nominalMeanPowerLevel*sqrt(abs(RTWPVarianceUpdate));
                                                       % Scaling -
                                       needed for noise floor estimation block
    else
        RTWPStandardDeviationUpdate=0.001*powTab(meanPowerLevel)
           /nominalMeanPowerLevel*sqrtTab(abs(RTWPVarianceUpdate));%
```

```
                                          Scaling - needed
                                   for noise floor estimation block
        end
    end
-Action 1403 ends
```

Figure 10:
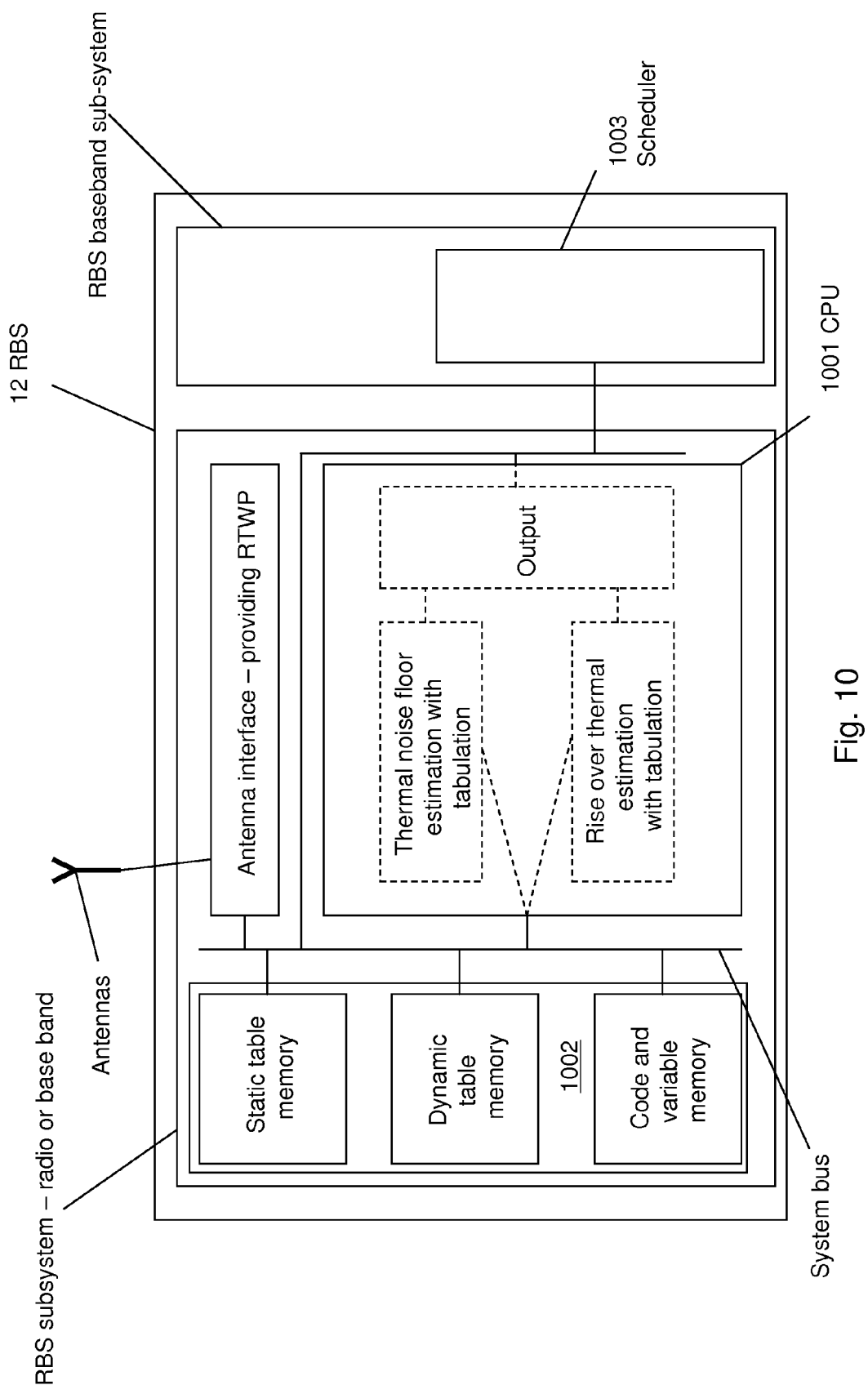
FIG. 10 is a schematic overview depicting an apparatus according to some embodiments herein.

FIG. 10 discloses a schematic overview of an apparatus i.e. the radio base station 12 performing the methods disclosed herein. Embodiments are further illustrated in FIG. 16 below. The apparatus of some embodiments herein comprises a computer, consisting of a central processing unit (CPU) 1001, a memory 1002 comprising a memory for storage of fix tables, other memory for storage of dynamically computed tables with the computed table entries, as well as memory for storage of computer code and variables used by such code. The computer may be of general purpose type, or a digital signal processor (DSP), or a computer implemented in dedicated hardware like a field programmable gate array (FPGA) or an application specific circuit (ASIC).

Some embodiments herein are preferably implemented in terms of computer code and tables that execute instructions according to the embodiments herein. The apparatus is either located in the radio sub-system of the RBS or in the base band subsystem of the RBS comprising a scheduler 1003. Apparatus figure is applicable to all methods. Algorithm instantiation is shown dashed.

Some embodiments herein are also equipped with an input (antenna) interface over which RTWP measurements are received. An output interface is also included, over which estimates of the thermal noise power floor and/or of the rise over thermal is delivered. The interfaces are internal to the RBS. The radio base station 12 may comprise different memories such as static table memory, dynamic table memory, and code and variable memory.

The embodiments herein for estimating thermal noise power floor with tabulation may be implemented through one or more processors, such as a processing circuit, e.g. CPU, in the radio base station 12 depicted in FIG. 10, together with computer program code for performing the functions and/or method actions of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

FIGS. 11-14 depict flow charts of different embodiments of a solution. A main theme is the use of coarse tables for computations of transcendental functions, appearing in the estimation algorithms described herein.

By a coarse table is here meant a table which table entries are as far apart as possible, without reducing the accuracy of the estimation algorithms described herein. The table coarseness is hence application specific and the maximum allowed step between adjacent table entries needs to be determined e.g. by simulation, to check that estimation algorithm performance is not compromised, as compared to the case where the exact function evaluation is used.

A further property of the coarse tables disclosed herein is that the range of the tables, defined by the smallest and largest table entry, normally the first and last table entry, is also kept as small as possible, without reducing the accuracy of the estimation algorithms described herein. The table range is hence application specific and the minimum range needs to be determined e.g. by simulation, to check that estimation algorithm performance is not compromised, as compared to the case where the exact function evaluation is used without a range limitation.

The consequence of the above two action defining the coarse tables, is that the number of table entries also becomes small. A consequence of this, in turn makes it possible to search the table very quickly, thereby reducing the computational complexity of the search. This complexity reduction is a key technical effect of embodiments herein. The need to search the table is explained elsewhere in this application.

It is particularly advantageous if the number of table entries can be a power of 2, in which situation binary search is easily applied. Binary search is defined elsewhere in this application. In case of binary search, a table of size N can be searched using $\log_2(N)$ compares. For the typical table sizes resulting for embodiments herein, i.e. 64, 128, 256, 512, 1024, this means that the search requires roughly 6, 7, 8, 9, 10, compares, respectively.

The computational complexity reduction achieved depends on the hardware support available for transcendental function evaluation. A general purpose personal computer with an Intel processor typically has efficient such support. Then there may not be any complexity reduction at all. However, processors used in radio base stations need to be of low cost. Therefore digital signal processors are typically used. These processors usually has hardware support for very efficient multiplication, addition and subtraction, and possibly divide. However, there is often no hardware support for transcendental function evaluation like $10^{x/10}$, $10 \log(x)$, $\sqrt{x}$, $e^x$, $x^\alpha$ and $x^{1-\alpha}$. In case an exact function evaluation is to be performed, this is usually done by specific algorithms that compute the function value in terms of a very accurate approximation. Such algorithms typically require many multiplications, and this then requires significantly more time than when a coarse table, adapted to the application is used.

Figure 11:
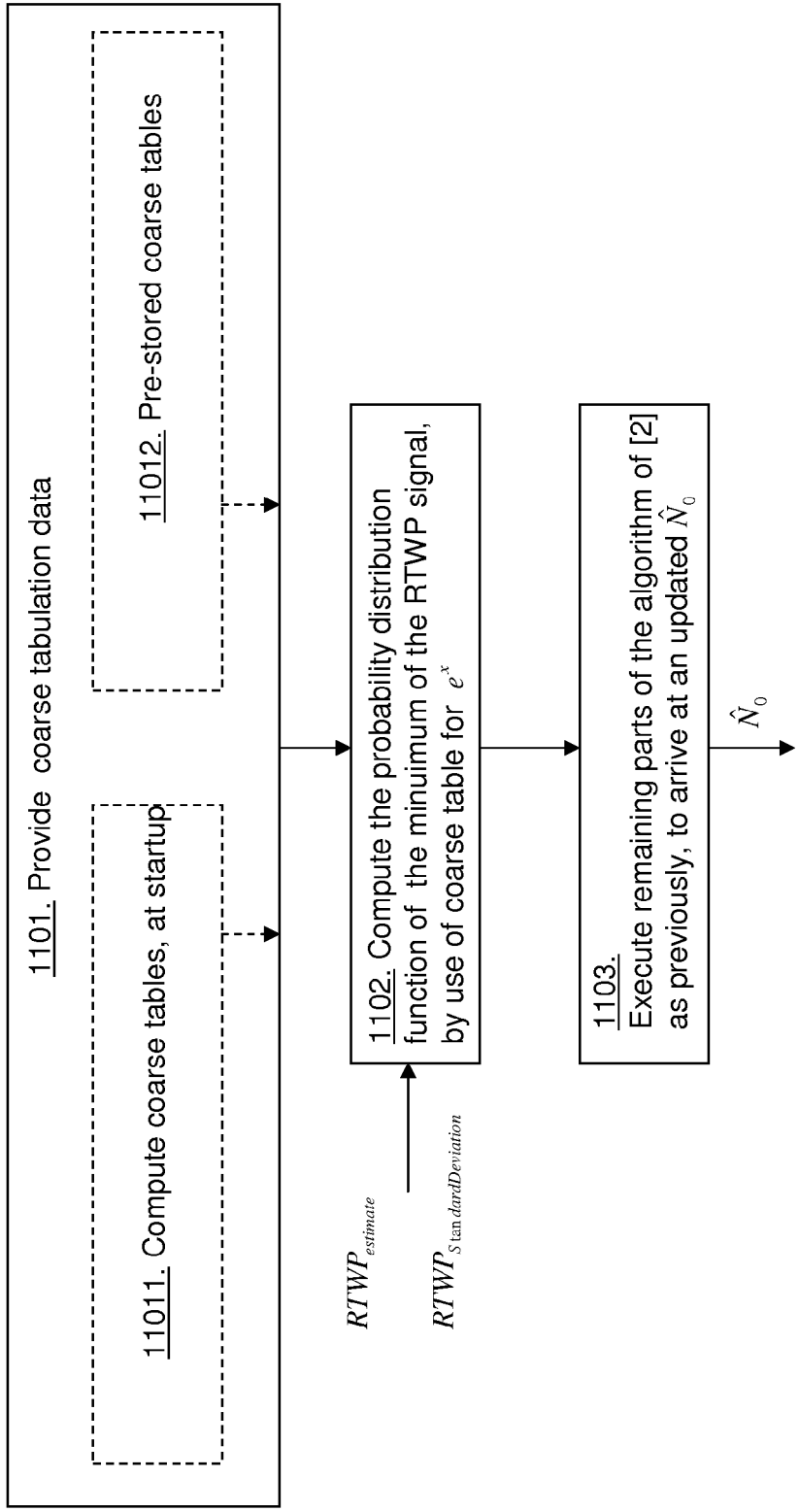
FIG. 11 is a schematic flow chart depicting a method for estimating noise floor according to embodiments herein.

FIG. 11 is a schematic flowchart depicting some embodiments to compute a thermal noise power floor estimate in the radio base station 12. The radio base station 12 being a current existing RBS. It should be noted that dashed boxes are optional.

Action 1101. The radio base station 12 provides coarse tabulation data.

Action 11011. The radio base station 12 may compute coarse tables, at startup.

Action 11012. The radio base station 12 may use pre-stored coarse tables. These have been manually been stored or stored during manufacturing or from a configuration.

Action 1102. The radio base station 12 may compute a probability distribution function of the minimum of a RTWP signal, by use of coarse table for $e^x$. The RTWP estimate and the standard deviation of RTWP is received from a different process, such as a process of computing the Rise over Thermal as disclosed below.

Action 1103. The radio base station 12 executes remaining parts of the algorithm of [2] as previously, to arrive at an updated thermal noise power floor estimate $\hat{N}_0$.

Figure 12:
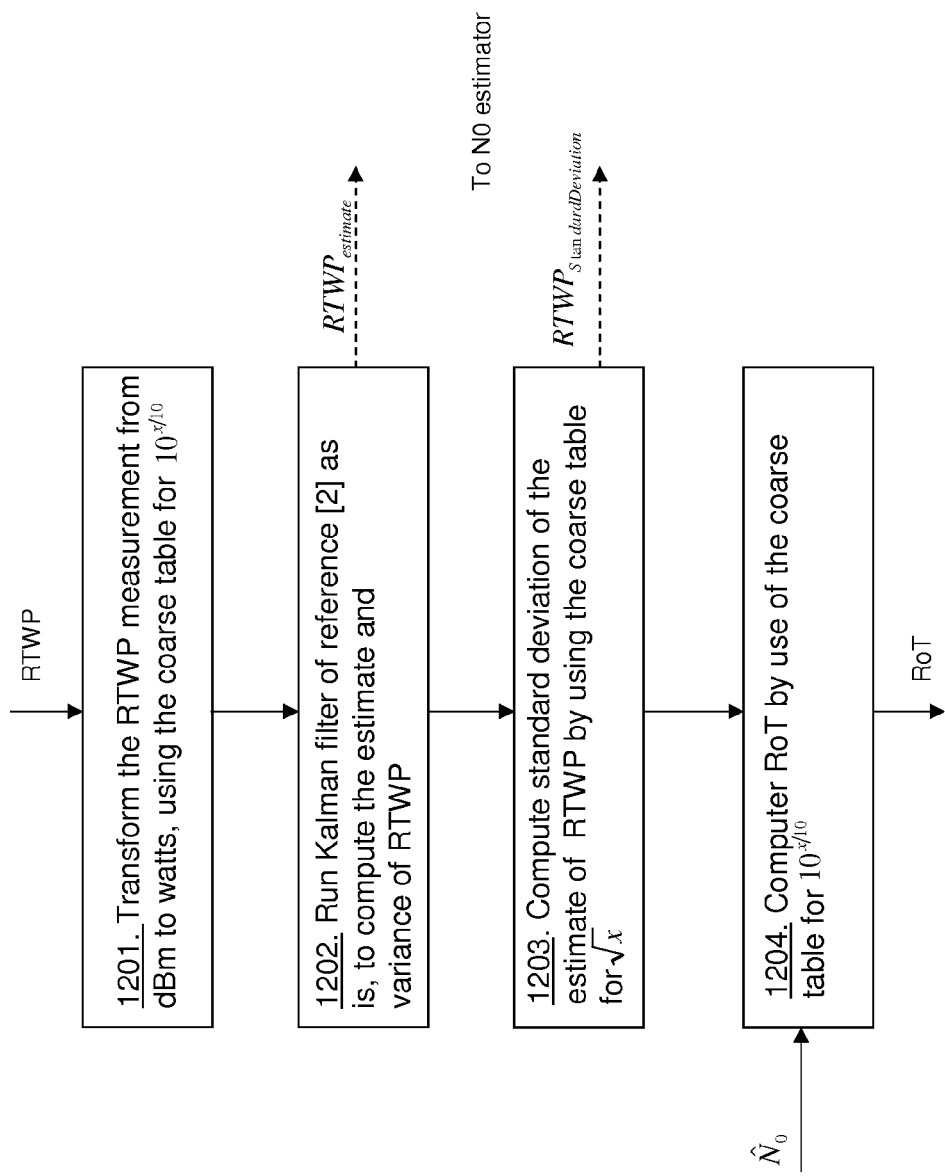
FIG. 12 is a schematic flow chart depicting a method for estimating RoT according to embodiments herein.

Some examples of method actions to compute RoT are disclosed in FIG. 12. Dashed arrows indicate other lower sampling period.

Action 1201. The radio base station 12 receives a load estimate such as a RTWP value from a process in the radio base station 12. The radio base station 12 transforms the RTWP measurement from dBm to watts, using a coarse table for $10^{x/10}$.

Action 1202. The radio base station 12 runs or executes a Kalman filter of reference [2] as is, to compute the estimate and variance of RTWP. The RTWP estimate may be used to compute the thermal noise power floor estimate $\hat{N}_0$ in FIG. 11.

Action 1203. The radio base station 12 may compute standard deviation of the estimate of RTWP by using the coarse table for $\sqrt{x}$.

Action 1204. The radio base station 12 computes a RoT by use of the coarse table for $10^{x/10}$ and received thermal noise power floor estimate $\hat{N}_0$ from the process of computing the thermal noise power floor estimate $\hat{N}_0$.

Figure 13:
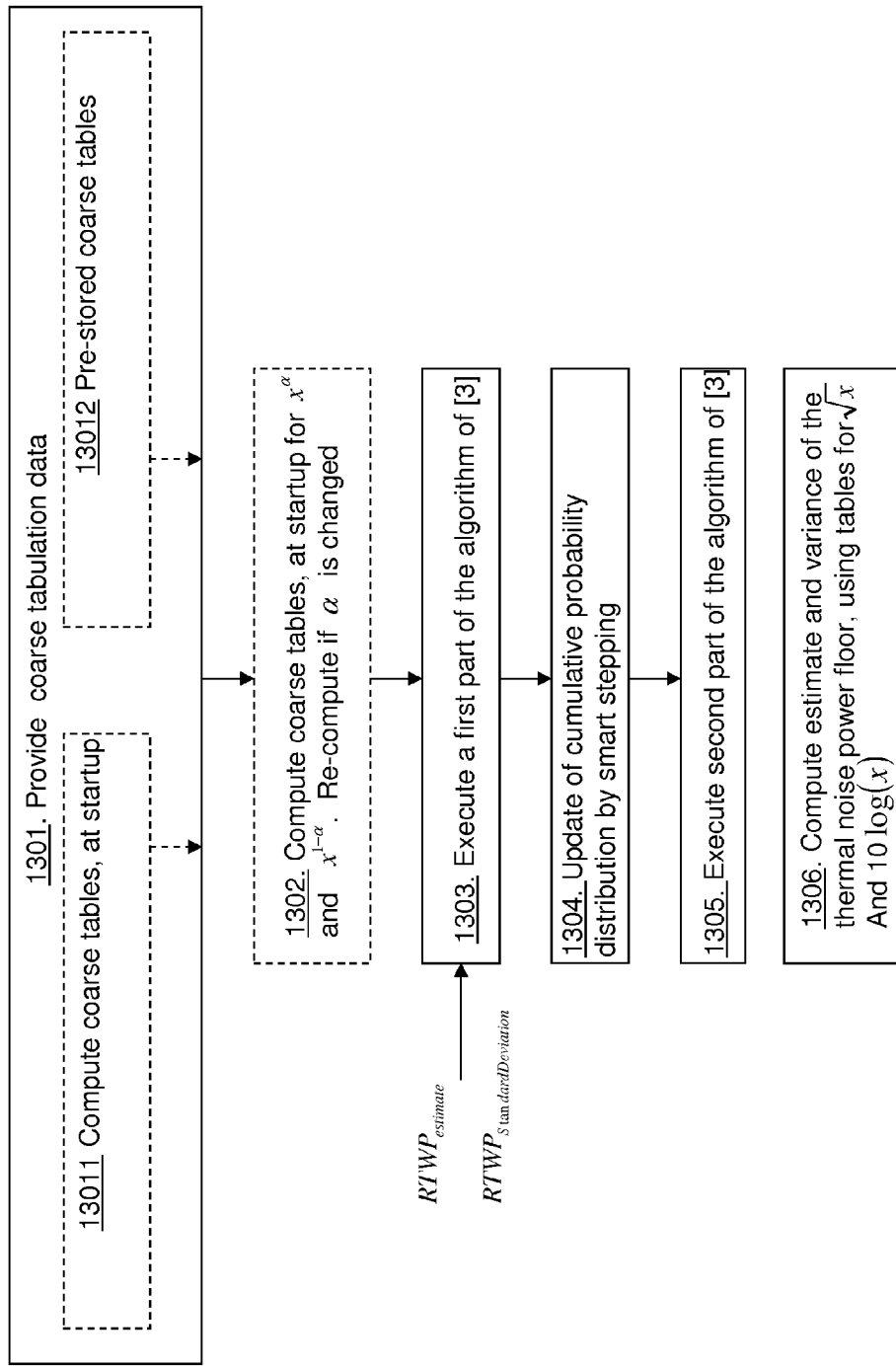
FIG. 13 is a schematic flow chart depicting a method for estimating noise floor according to embodiments herein.

FIG. 13 is a schematic flowchart depicting methods in the radio base station 12 according to some embodiments disclosed herein. The radio base station 12 may be an epic RBS or a, future, macro RBS. It should be noted that dashed boxes are optional.

Action 1301. The radio base station 12 provides coarse tabulation data.

Action 13011. The radio base station 12 may compute coarse tables, at startup.

Action 13012. The radio base station 12 may use pre-stored coarse tables. These have been manually been stored or stored during manufacturing or from a configuration.

Action 1302. The radio base station 12 computes coarse tables, at startup for $x^\alpha$ and $x^{1-\alpha}$. Re-compute if $\alpha$ is changed.

Action 1303. The radio base station 12 executes a first part of the algorithm of [3]. Based on received RTWP values and RTWP standard deviation. These are received from a process computing the RoT.

Action 1304. The radio base station 12 updates cumulative probability distribution by smart stepping, see section above.

Action 1305. The radio base station 12 executes second part of the algorithm of [3].

Action 1306. The radio base station 12 computes estimate and variance of the thermal noise power floor, using tables for $\sqrt{x}$ and for $10 \log(x)$.

Figure 14:
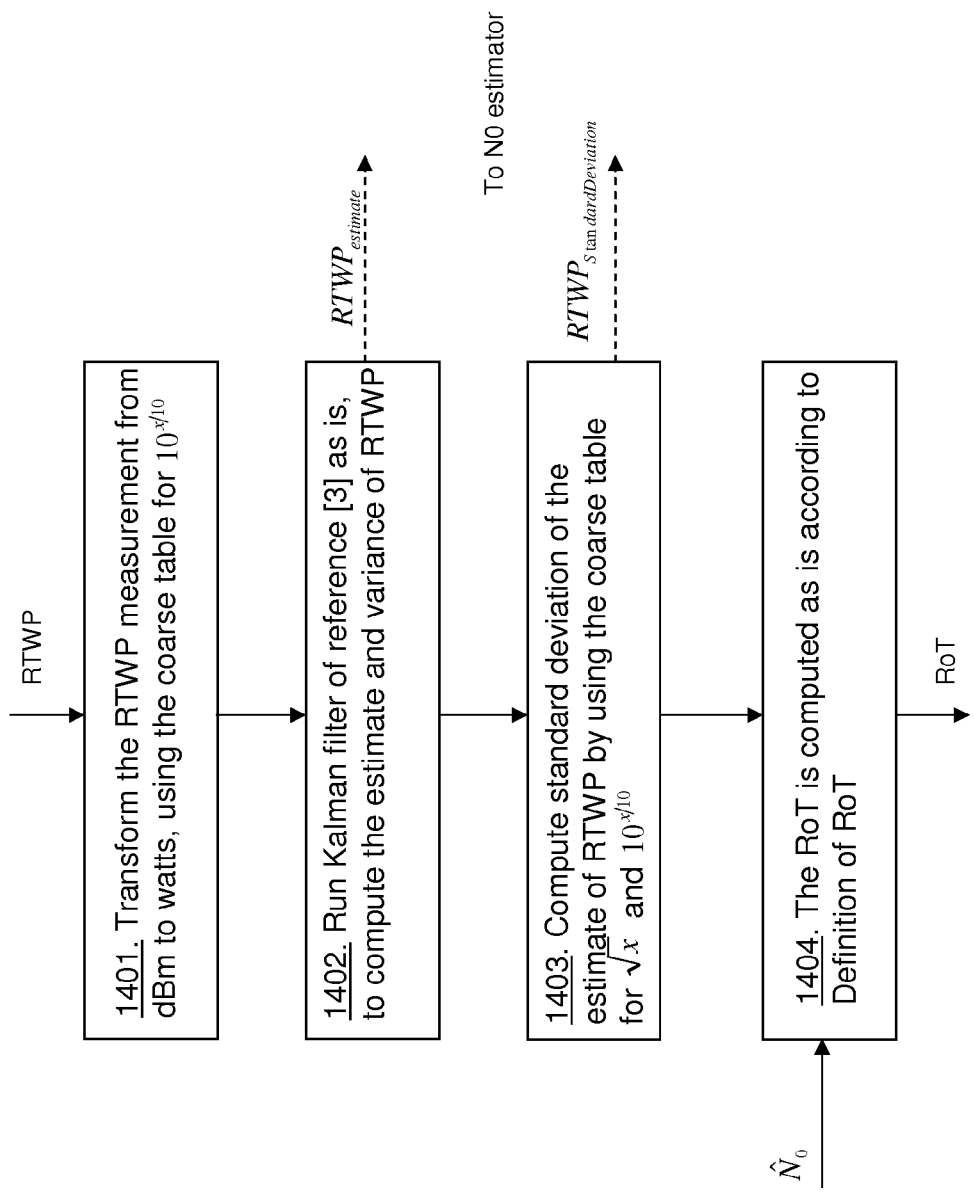
FIG. 14 is a schematic flow chart depicting a method for estimating RoT.

Examples of method actions to compute RoT are disclosed in FIG. 14. Dashed arrows indicate other lower sampling period.

Action 1401. The radio base station 12 receives a load estimate such as a RTWP value from a process in the radio base station 12. The radio base station 12 transforms the RTWP measurement from dBm to watts, using a coarse table for $10^{x/10}$.

Action 1402. The radio base station 12 runs Kalman filter of reference [3] as is, to compute the estimate and variance of RTWP. This is fed to the process of estimating the thermal noise power floor.

Action 1403. The radio base station 12 may compute standard deviation of the estimate of RTWP by using the coarse tables for $\sqrt{x}$ and $10^{x/10}$. The standard deviation is sent to the process of computing the thermal noise power floor estimate.

Action 1404. The radio base station 12 computes the RoT as is according to definition of RoT based on received thermal noise power floor estimate.

The advantages of embodiments herein are a significant reduction of the computational complexity of the fundamental algorithms for thermal noise power floor estimation but may also reduce computational complexity for RoT estimation. This in turn allows handling of more sectors, antenna branches and carriers of each RBS, without the need to employ more capable and hence more expensive CPU hardware.

Figure 15:
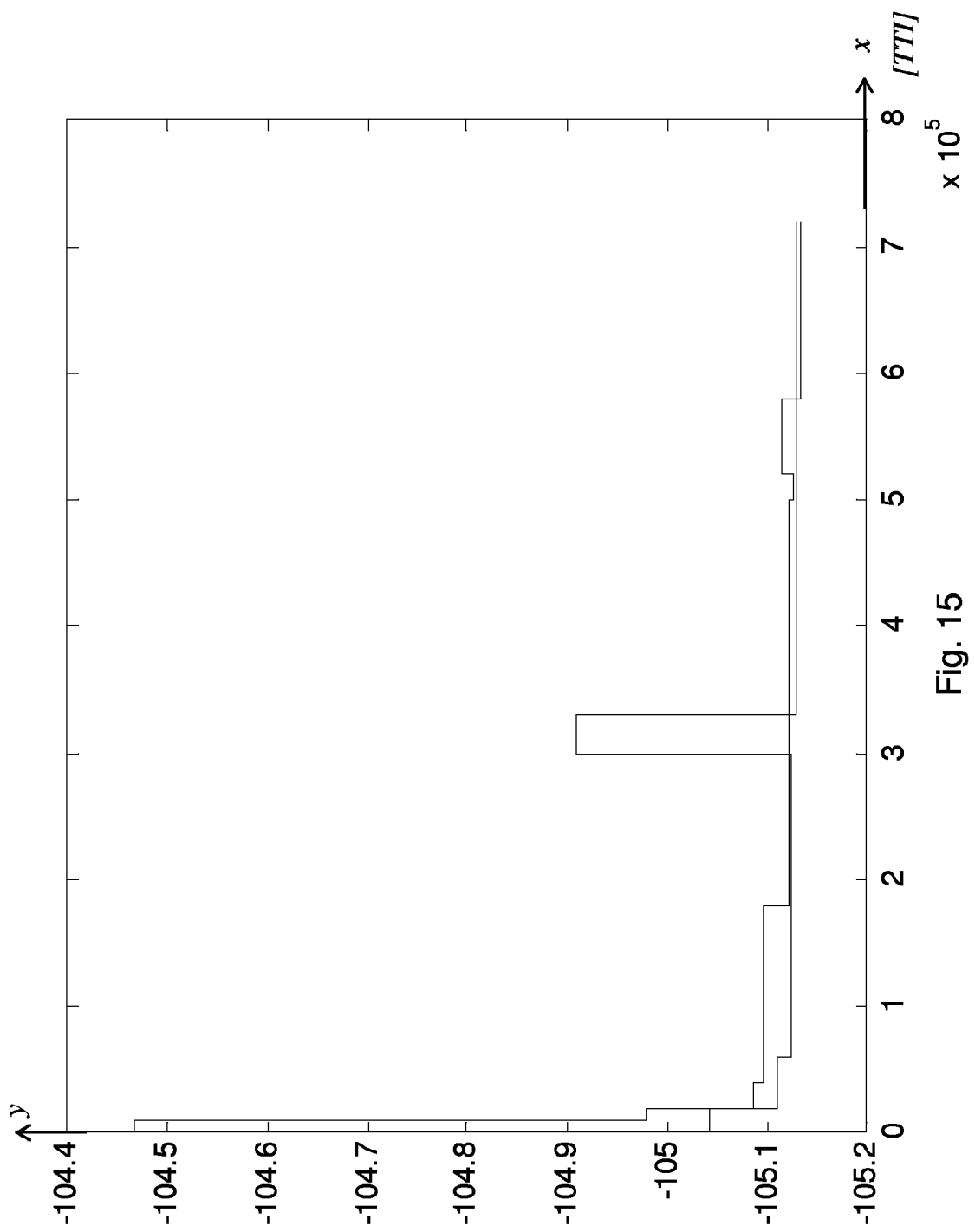
FIG. 15 shows a graph depicting a transient initial convergence of the thermal noise power floor algorithm with and without tabulation.

An important advantage of embodiments herein is that complexity is reduced, without affecting the performance negatively in any significant way. This is illustrated in FIG. 15, which shows the transient initial convergence of the thermal noise power floor algorithm with and without tabulation. Despite the fact that different RTWP signals are used as input to the estimators, the difference is insignificant after processing of 720000 Transmission Time Intervals (TTI) being 2 hours, defined along an x-axis. The illustration of FIG. 15 is for the recursive algorithm of [3]. FIG. 15 shows an initial convergence of the thermal noise power floor estimation algorithm [3] with and without application of embodiments herein. As seen the results, defined along a y-axis, show small differences but embodiments disclosed herein show a reduced computational complexity.

Embodiments herein may achieve a reduced computational complexity by a method in the radio base station 12 for computing thermal noise power floor estimation and/or rise over thermal estimation in a radio communications network. The radio base station 12 performs a transcendental function evaluation by using a reduced range of table entries.

Embodiments herein perform a transcendental function evaluation using a tabulation process minimizing computational steps to estimate noise floor and/or rise over thermal.

In some embodiments coarse tables are used for $10 \log(x)$, $10^{x/10}$, $\sqrt{x}$, $e^x$ when estimating noise floor.

In some embodiments a binary search is used for $e^x$ when estimating noise floor.

In some embodiments the estimated noise floor is used when estimating the rise over thermal.

In some embodiments coarse tables are used for $10 \log(x)$, $10^{x/10}$, $\sqrt{x}$ when In some embodiments coarse tables entries $x^\alpha$ and $x^{1-\alpha}$ are computed for every updated alpha value, thus, during run-time in case the parameter $\alpha$ is changed the coarse table entries $x^\alpha$ and $x^{1-\alpha}$ are recalculated. This is done when estimating noise floor.

In some embodiments an update of a cumulative probability distribution is performed using smart stepping when estimating noise floor.

In some embodiments the noise floor estimate is updated by means of coarse tables for $10 \log(x)$ and $\sqrt{x}$.

According to some embodiments a radio base station to perform the method actions is also provided herein.

Embodiments herein disclose new computation means that reduce the computational complexities of the fundamental i) N0 and ii) RoT estimation algorithms, that measure the load level over the UL WCDMA air interface.

The complexity reduction is due to the fact that typical CPUs used for thermal noise power floor and rise over thermal estimation lack hardware support for transcendental function evaluation. Such CPUs therefore perform transcendental function evaluation by means of specific algorithms for this purpose. Since the CPUs are general purpose the transcendental function evaluation needs to be highly accurate over the full range of values supported by the arithmetic system of the CPU. The consequence is that many operations may need to be executed by the CPUs for each transcendental function evaluation, which takes a long time. The disclosed embodiments herein hence reduces the complexity of the transcendental function evaluation by trading reduced range and accuracy not needed for thermal noise power floor estimation and rise over thermal estimation, for a reduced computational effort, resulting in a reduced processing time. The reduced range is obtained by consideration of which range that is actually use for the specific application, here thermal noise power floor estimation and rise over thermal estimation. This is normally achieved by simulation in practice.

Figure 16:
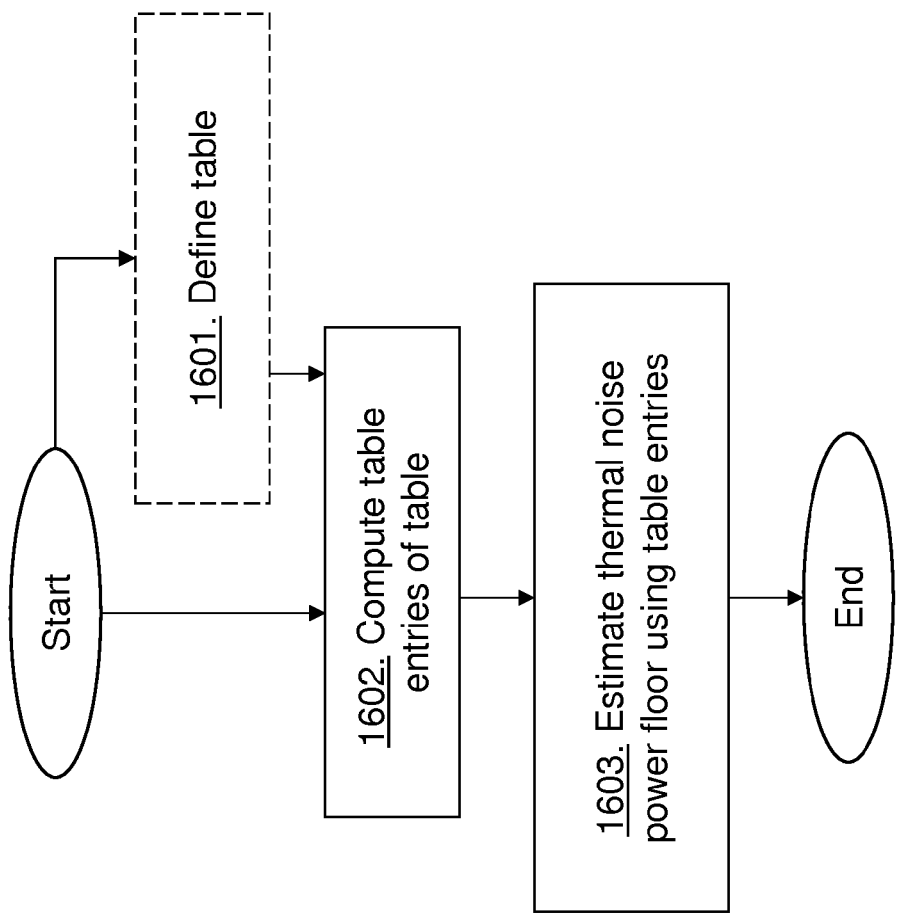
FIG. 16 shows a flow chart depicting a method in a radio base station according to embodiments herein.

The method actions in the radio base station 12 for performing thermal noise power floor estimation according to some embodiments will now be described with reference to a flowchart depicted in FIG. 16. The actions do not have to be taken in the order stated below, but may be taken in any suitable order. Actions performed in some embodiments are marked with dashed boxes.

Action 1601. The radio base station 12 may define a table with a smallest table entry, a largest table entry, and the number of table entries. Thus, defining a table of minimized size.

Action 1602. The radio base station 12 computes table entries for the table for a transcendental function evaluation, which table is of minimized size with a range of table entries defined by the smallest table entry, the largest table entry, and the number of table entries.

Action 1603. The radio base station 12 estimates a thermal noise power floor by performing a transcendental function evaluation in computing a product representing a cumulative probability function. The transcendental function evaluation is performed by using table look ups of the table with the computed table entries and the cumulative probability function is related to the thermal noise power floor. In some embodiments all table look ups, of a table look up process, of one single updating are performed using a smart stepping, wherein the table look up process is performed by starting a search at one end of the table and traversing to the other end of the table. This is also illustrated in action 1304 above. The transcendental function evaluation may be for $x^\alpha$ and $x^{1-\alpha}$, where x is an independent variable and $\alpha$ is a parameter, and the table entries are recomputed when $\alpha$ is modified. This is also illustrated in action 1302 above. The transcendental function evaluation may also be for 10 log(x), $10^{x/10}$, $\sqrt{x}$, and/or $e^x$. A binary search may then be used in the table look up for $e^x$ when estimating thermal noise power floor.

Figure 17:
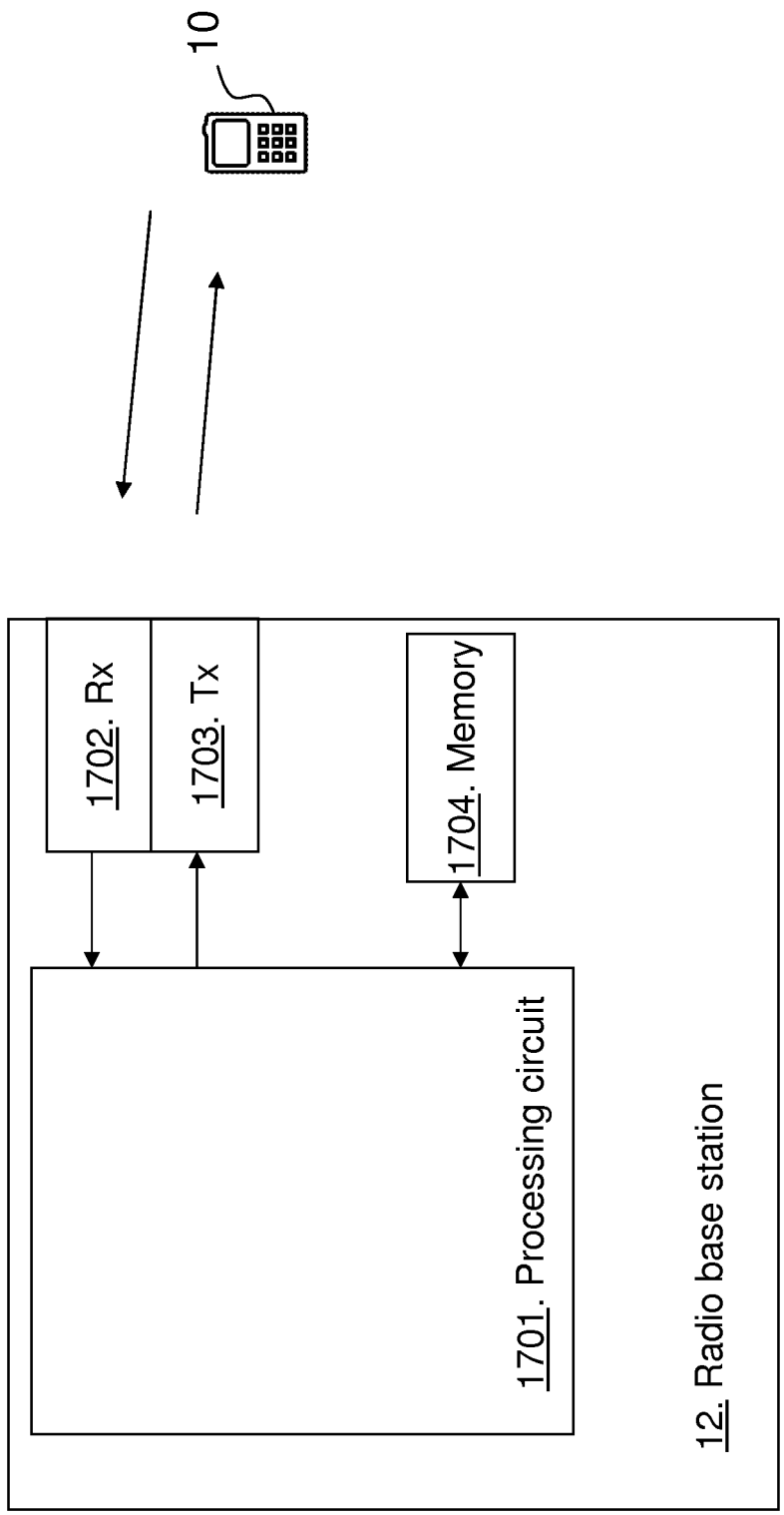
FIG. 17 shows a radio base station according to embodiments herein.

FIG. 17 is a block diagram depicting the radio base station 12 according to embodiments herein. The radio base station 12 is configured for performing thermal noise power floor estimation in the radio communications network 1.

The radio base station 12 comprises a processing circuit 1701 configured to compute table entries for a table for a transcendental function evaluation. The table is of minimized size with a range of table entries defined by the smallest table entry, the largest table entry, and the number of table entries. The processing circuit 1701 is further configured to estimate a thermal noise power floor by performing a transcendental function evaluation in computing a product representing a cumulative probability function. The cumulative probability function is related to the thermal noise power floor, and the transcendental function evaluation is performed by using table look ups of the table with the computed table entries. The processing circuit 1701 may further be configured to define the table with the smallest table entry, the largest table entry, and the number of table entries. The processing circuit 1701 may be configured to perform all table look ups, of a table look up process, of one single updating using a smart stepping, wherein the table look up process is performed by starting a search at one end of the table and traversing to the other end of the table. The transcendental function evaluation may be for $x^\alpha$ and $x^{1-\alpha}$, where x is an independent variable and $\alpha$ is a parameter, and the processing circuit 1701 is configured to recompute table entries when $\alpha$ is modified.

Furthermore, the radio base station 12 comprises a receiving circuit (RX) 1702 that may be configured to receive e.g. table entries from a managing node, signals from the user equipment 10 etc.

In addition, the radio base station 12 further comprises a transmitting circuit (TX) 1703 that may be configured to transmit data to other nodes or user equipments, e.g estimates of thermal noise power floor, RoTs etc.

Additionally, the radio base station 12 comprises a memory 1704 that may be configured to store thermal noise power floor estimates, RoTs etc.

The embodiments herein for performing thermal noise power floor estimation in the radio communications network 1 may be implemented through the processing circuit 1701 in the radio base station 12 depicted in FIG. 17, together with computer program code for performing the functions and/or method actions of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing circuits discussed may be provided through the use of dedicated hardware, while others are provided with hardware for executing software, in association with the appropriate software or firmware. Thus, the term "processing circuit", "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

ABBREVIATIONS

ASIC Application Specific Integrated Circuit
CPU Central Processing Unit

DSP Digital Signal Processor
EUL Enhanced Uplink
FPGA Field Programmable Gate Array
N0 Thermal noise power floor level
RoT Rise over Thermal
RBS Radio Base Station
RTWP Received Total wideband Power
WCDMA Wideband Code Division Multiple Access

REFERENCES

[1] T. Wigren, "Soft uplink load estimation in WCDMA", *IEEE Transactions on Vehicular Technology*, vol. 58, no. 2, pp. 760-772, 2009 (attached).
[2] T. Wigren, "Estimation of uplink WCDMA load in a single RBS", *IEEE VTC 2007 Fall*, Baltimore, USA, 2007 (attached).
[3] T. Wigren, "Recursive noise floor estimation in WCDMA", *IEEE Transactions on Vehicular Technology*, vol. 59, no. 5, pp. 2615-2620, 2010 (attached).

The invention claimed is:

1. A method in a radio base station connected to a radio network controller for performing thermal noise power floor estimation in a radio communications network, the radio base station communicating with a plurality of mobile devices in the radio communications network, the method comprising:
computing, by a processor of the radio base station, table entries for a table for an evaluation of a transcendental function, which table has a range of table entries defined by a smallest table entry, a largest table entry, and a number of table entries;
estimating, by the processor of the radio base station, a thermal noise power floor by performing the evaluation of the transcendental function in computing a product representing a cumulative probability function, which cumulative probability function is related to the thermal noise power floor, wherein the evaluation of the transcendental function is performed by using table look ups of the table with the computed table entries; and
dynamically re-computing, by the processor of the radio base station, the table entries for the table when a value of at least one parameter in the transcendental function is modified.

2. A method according to claim 1, further comprising:
defining, by the processor of the radio base station, the table with the smallest table entry, the largest table entry, and the number of table entries.

3. A method according to claim 1, wherein all table look ups, of a table look up process, of one single updating are performed using a smart stepping wherein the table look up process is performed by starting a search at one end of the table and traversing to the other end of the table.

4. A method according to claim 1, wherein the evaluation of the transcendental function is for $x^\alpha$ and $x^{1-\alpha}$, where x is an independent variable and $\alpha$ is a parameter, and the table entries are dynamically recomputed by the processor of the radio base station when $\alpha$ is modified.

5. A method according to claim 1, wherein the entries in the table for the evaluation of the transcendental function are logarithmically distributed.

6. A method according to claim 1, wherein the table for the evaluation of the transcendental function comprises less than or equal to one-thousand and twenty-four entries.

7. A radio base station connected to a radio network controller for performing thermal noise power floor estimation in a radio communications network, the radio base station communicating with a plurality of mobile devices in the radio communications network, the radio base station comprising:
a processor configured to:
compute table entries for a table for an evaluation of a transcendental function, which table has a range of table entries defined by a smallest table entry, a largest table entry, and a number of table entries,
estimate a thermal noise power floor by performing the evaluation of the transcendental function in computing a product representing a cumulative probability function, which cumulative probability function is related to the thermal noise power floor, and wherein the evaluation of the transcendental function is performed by using table look ups of the table with the computed table entries, and
dynamically re-compute the table entries for the table when a value of at least one parameter in the transcendental function is modified; and
a memory coupled to the processor, the memory configured to store the estimated thermal noise power floor.

8. A radio base station according to claim 7, wherein the processor is further configured to define the table with the smallest table entry, the largest table entry, and the number of table entries.

9. A radio base station according to claim 7, wherein the processor is configured to perform all table look ups, of a look up process, of one single updating using a smart stepping, wherein the table look up process is performed by starting a search at one end of the table and traversing to the other end of the table.

10. A radio base station according to claim 7, wherein the evaluation of the transcendental function is for $x^\alpha$ and $x^{1-\alpha}$, where x is an independent variable and $\alpha$ is a parameter, and the table entries are dynamically recomputed by the processor of the radio base station when $\alpha$ is modified.

11. A radio base station according to claim 7, wherein the entries in the table for the evaluation of the transcendental function are logarithmically distributed.

12. A radio base station according to claim 7, wherein the table for the evaluation of the transcendental function comprises less than or equal to one-thousand and twenty-four entries.

* * * * *